(12) United States Patent
Souma

(10) Patent No.: US 7,379,250 B2
(45) Date of Patent: May 27, 2008

(54) VARIABLE MAGNIFICATION OPTICAL SYSTEM AND IMAGE-TAKING APPARATUS

(75) Inventor: Yoshihito Souma, Sakai (JP)

(73) Assignee: Konica Minolta Opto, Inc., Tokyo (JP)

(*) Notice: Subject to any disclaimer, the term of this patent is extended or adjusted under 35 U.S.C. 154(b) by 0 days.

(21) Appl. No.: 11/732,401

(22) Filed: Apr. 3, 2007

(65) Prior Publication Data
US 2007/0229973 A1 Oct. 4, 2007

(30) Foreign Application Priority Data
Apr. 30, 2006 (JP) .............................. 2006-102185

(51) Int. Cl.
G02B 15/14 (2006.01)
G02B 27/64 (2006.01)

(52) U.S. Cl. .................. 359/686; 359/557; 359/682

(58) Field of Classification Search ............ 359/680, 359/681, 682, 686, 554, 557
See application file for complete search history.

(56) References Cited

U.S. PATENT DOCUMENTS
5,999,329 A * 12/1999 Ohtake ..................... 359/686

FOREIGN PATENT DOCUMENTS
| JP | 11-174329 A | 7/1999 |
| JP | 2004-061679 A | 2/2004 |
| JP | 2004-061910 A | 2/2004 |
| JP | 2004-205796 A | 7/2004 |

* cited by examiner

Primary Examiner—Scott J. Sugarman
(74) Attorney, Agent, or Firm—Sidley Austin LLP

(57) ABSTRACT

A variable magnification optical system including at least: a first lens group having a negative optical power, a second lens group having a positive optical power, a third lens group having a negative optical power, and a fourth lens group having a positive optical power moves the second lens group in an—in-surface direction vertical to the optical axis direction in zooming to thereby correct shake resulting from imaging on the image surface.

13 Claims, 9 Drawing Sheets

EX1 FNo.=2.68 [W]

-0.1   0.1
SPHERICAL   SINE
ABERRATION   CONDITION

— d
– – g
- - - SC

EX1 Y'=4.5 [W]

-0.1   0.1
ASTIGMATISM

– – – DM
—— DS

EX1 Y'=4.5 [W]

-5.0   5.0
DISTORTION

EX1 FNo.=3.78 [M]

-0.1   0.1
SPHERICAL   SINE
ABERRATION   CONDITION

— d
– – g
- - - SC

EX1 Y'=4.5 [M]

-0.1   0.1
ASTIGMATISM

– – – DM
—— DS

EX1 Y'=4.5 [M]

-5.0   5.0
DISTORTION

EX1 FNo.=5.10 [T]

-0.1   0.1
SPHERICAL   SINE
ABERRATION   CONDITION

— d
– – g
- - - SC

EX1 Y'=4.5 [T]

-0.1   0.1
ASTIGMATISM

– – – DM
—— DS

EX1 Y'=4.5 [T]

-5.0   5.0
DISTORTION

EX1 [W], [BEFORE], [Y'=3.6]

EX1 [W], [BEFORE], [Y'=0.0]

EX1 [W], [BEFORE], [Y'=-3.6]

EX1 [W], [AFTER], [Y'=3.6]

EX1 [W], [AFTER], [Y'=0.0]

EX1 [W], [AFTER], [Y'=-3.6]

EX1 [T],[AFTER],[Y'=3.6]

EX1 [T],[AFTER],[Y'=0.0]

EX1 [T],[AFTER],[Y'=-3.6]

EX1 [T],[BEFORE],[Y'=3.6]

EX1 [T],[BEFORE],[Y'=0.0]

EX1 [T],[BEFORE],[Y'=-3.6]

EX2 FNo.=2.79 [W]
—— d
----- g
--- SC
-0.1   0.1
SPHERICAL  SINE
ABERRATION CONDITION

EX2 Y'=4.5 [W]
----- DM
—— DS
-0.1   0.1
ASTIGMATISM

EX2 Y'=4.5 [W]
-5.0   5.0
DISTORTION

EX2 FNo.=3.84 [M]
—— d
----- g
--- SC
-0.1   0.1
SPHERICAL  SINE
ABERRATION CONDITION

EX2 Y'=4.5 [M]
----- DM
—— DS
-0.1   0.1
ASTIGMATISM

EX2 Y'=4.5 [M]
-5.0   5.0
DISTORTION

EX2 FNo.=5.10 [T]
—— d
----- g
--- SC
-0.1   0.1
SPHERICAL  SINE
ABERRATION CONDITION

EX2 Y'=4.5 [T]
----- DM
—— DS
-0.1   0.1
ASTIGMATISM

EX2 Y'=4.5 [T]
-5.0   5.0
DISTORTION

EX2 [W],[BEFORE],[Y'=3.6]

EX2 [W],[BEFORE],[Y'=0.0]

EX2 [W],[BEFORE],[Y'=-3.6]

EX2 [W],[AFTER],[Y'=3.6]

EX2 [W],[AFTER],[Y'=0.0]

EX2 [W],[AFTER],[Y'=-3.6]

EX2 [T],[BEFORE],[Y'=3.6]

EX2 [T],[BEFORE],[Y'=0.0]

EX2 [T],[BEFORE],[Y'=-3.6]

EX2 [T],[AFTER],[Y'=3.6]

EX2 [T],[AFTER],[Y'=0.0]

EX2 [T],[AFTER],[Y'=-3.6]

VARIABLE MAGNIFICATION OPTICAL SYSTEM AND IMAGE-TAKING APPARATUS

This application is based on Japanese Patent Application No. 2006-102185 filed on Apr. 3, 2006, the contents of which are hereby incorporated by reference.

BACKGROUND OF THE INVENTION

1. Field of the Invention

The present invention relates to a variable magnification optical system which guides light from a photographing target (on the object side) to an image sensor, and an image-taking apparatus provided with such a variable magnification optical system. More specifically, the present invention relates to a variable magnification optical system provided with vibration-proof function and an image-taking apparatus provided with such a variable magnification optical system.

2. Description of the Related Arts

Conventionally, a variable magnification optical system having power arrangement, from the object side to the image side, "negative, positive, negative, and positive" is said to be suitable for achieving a wider angle and higher magnification. Thus, various variable magnification optical systems having such power arrangement have been disclosed (patent documents 1 to 4).

For example, patents documents 1 to 3 disclose variable magnification optical systems adopted for interchangeable lenses for a single-reflex camera or the like. In particular, these variable magnification optical systems achieve vibration-proof function (so called camera-shake correction function) by moving a lens group located at some position from the object side to the image side in the in-surface direction vertical to the optical axis direction.

Specifically, the camera-shake correction is performed by part of a second lens group of the variable magnification optical system of patent document 1, a third lens group of the variable magnification optical system of patent document 2, a latter half portion of the divided fourth lens group of the variable magnification optical system of patent document 3.

On the other hand, the variable magnification optical system of patent document 4 bends the optical axis by having an optical prism included in a most object side lens group. Thus, such a variable magnification optical system does not extend in one direction, and thus is easily loaded in a small-size image-taking apparatus (compact camera or the like).

[Patent document 1] JP-A-2004-61910
[Patent document 2] JP-A-11-174329
[Patent document 3] JP-A-2004-61679
[Patent document 3] JP-A-2004-205796

The variable magnification optical systems disclosed in patent documents 1 to 3 are assumed to be used for an interchangeable lens for a single-reflex camera or the like. However, these variable magnification optical systems cannot provide sufficient aberration performance in compact digital cameras of a six-million-pixel class which have been recently distributed. Moreover, in zooming performed in a variable magnification optical system having "negative, positive, negative, and positive" optical powers for use in a single-lens reflex, a first lens group moves by utilizing a cam ring or the like. However, in a compact digital camera, the first lens group is moved directly by a driving force such as provided by an actuator or the like. Thus, it is preferable that the first lens group relatively heavy in weight be not moved.

What is important in a variable magnification optical system having a lens group which moves for camera-shake correction (vibration-proof lens group) is the degree of sensitivity to decentering, i.e., the ratio of the amount of movement of the vibration-proof lens group with respect to the amount of movement of an imaging point on the image surface. That is, the degree of sensitivity to decentering needs to be set appropriately. However, the variable magnification optical systems of patent documents 2 and 3 perform camera-shake correction by moving the lens group located relatively close to the image side (third or fourth lens group).

Such a case may bring about situation in which the degree of sensitivity to decentering is insufficient, but these variable magnification optical systems set the degree of sensitivity to decentering in just proportion by providing long back focus. Consequently, in a case of a small-size image-taking apparatus which inevitably has relatively short back focus, the variable magnification optical systems of patent documents 2 and 3 have difficulty in appropriately setting the degree of sensitivity to decentering. Therefore, the variable magnification optical systems of patent documents 2 and 3 are not suitable for being loaded in a small-size image-taking apparatus.

On the other hand, the variable magnification optical system of patent document 1 moves a partial portion in the single lens group in the in-surface direction vertical to the optical axis direction, thus permitting camera-shake correction by using a motor or the like which provides a relatively small thrust force. Thus, such a variable magnification optical system is preferably suitable for being loaded in a small-size image-taking apparatus. However, the lens groups of the variable magnification optical system are so designed as to be capable of correcting various aberration. Thus, in a case where camera-shake correction is performed by moving part of the single lens group, it is difficult to sufficiently correct the various aberration. Therefore, such a variable magnification optical system is capable of performing camera-shake correction but fails to provide a high-grade image (fail to sufficiently suppress various aberration in camera-shake correction).

The variable magnification optical system of patent document 4 is easy to be loaded in a small-size image-taking apparatus, but has no camera-shake correction function. Thus, the variable magnification optical system of patent document 4 is susceptible to camera-shake.

SUMMARY OF THE INVENTION

In view of the problem described above, the present invention has been made, and it is an object of the invention to provide a variable magnification optical system or the like provided with camera-shake correction function and suitable for use in a small-size image-taking apparatus such as a compact camera or the like.

The invention refers to a variable magnification optical system having a plurality of lens groups for imaging light from an object side on an image surface of an image sensor. In this variable magnification optical system, the plurality of lens groups includes at least: in order from the object side to an image side, the first lens group having a negative optical power, the second lens group having a positive optical power, the third lens group having a negative optical power, and the fourth lens group having a positive optical power. Moreover, in this variable magnification optical system, the second lens group moves in an in-surface direction vertical to an optical axis direction to thereby correct shake resulting from imaging on the image surface, and further conditional formula (1) below is fulfilled:

$$1.7 \leq f2/Y'\text{max} \leq 2.7 \quad \text{Conditional formula (1),}$$

where f2: denotes a focal length of the second lens group; and

Y'max: denotes a maximum image height on the image surface.

The first lens group is immobile in the optical axis direction with respect to the image surface.

A variable magnification optical system according to the invention may have a plurality of lens groups including four lens groups: in order from an object side to an image side, the first lens group having a negative optical power, the second lens group having a positive optical power, the third lens group having a negative optical power, and the fourth lens group having a positive optical power, in which, in an optical axis direction, the second lens group may move in an in-surface direction vertical to an optical axis direction to thereby correct shake resulting from imaging on an image surface.

The above-mentioned objects as well as other objects and characteristics of the invention will be more clarified by the following description of the preferred embodiments and also by referring to the accompanying drawing.

DETAILED DESCRIPTION OF THE PREFERRED EMBODIMENTS

First Embodiment

Hereinafter, one embodiment of the present invention will be described, with reference to the accompanying drawings.

[1. Digital Still Camera]

Figure 9:
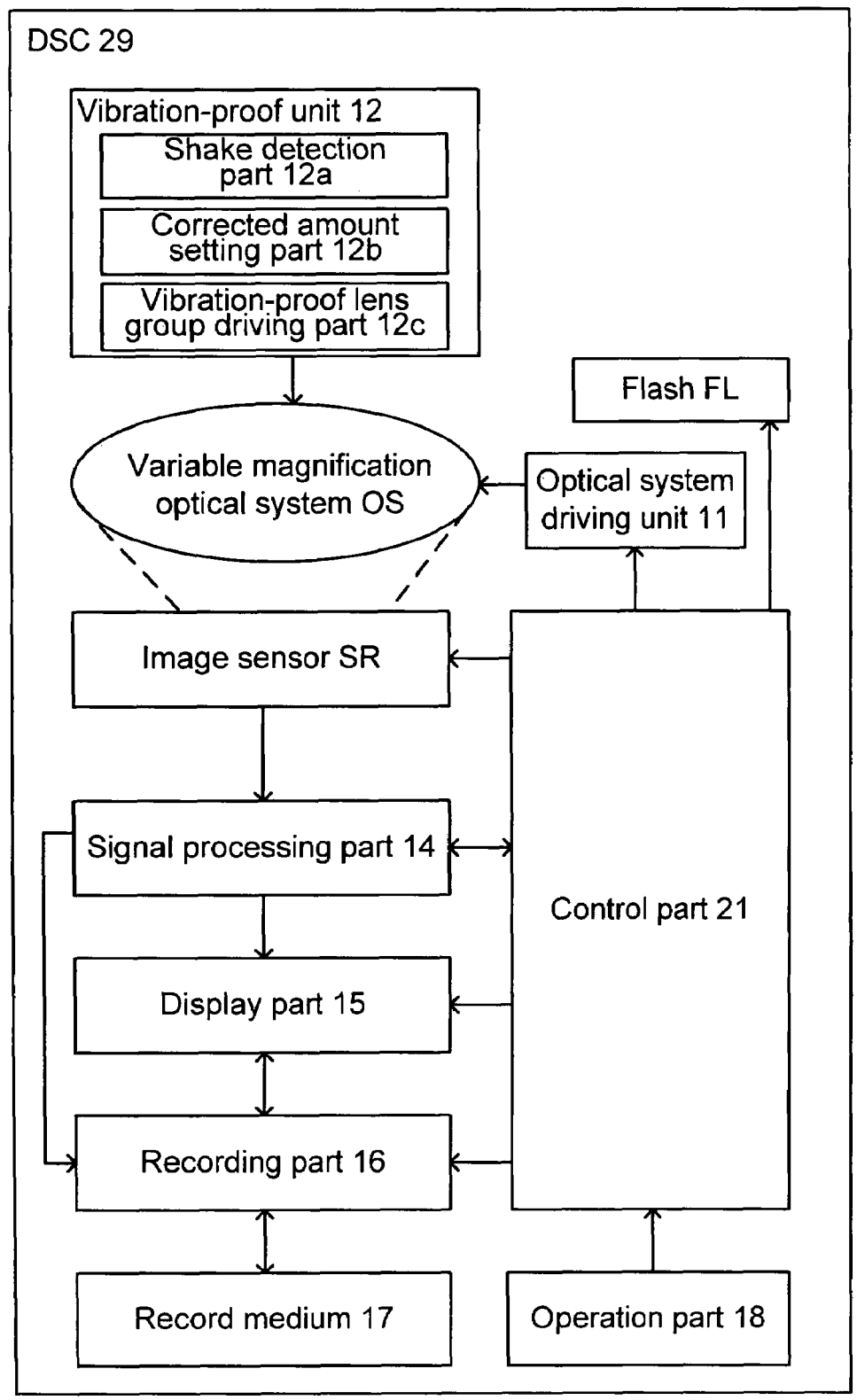
FIG. 9 is a block diagram showing configuration of a digital still camera.

FIG. 9 is a block diagram showing the inside of a digital still camera {DSC (image-taking apparatus)} 29 loaded with a variable magnification optical system OS.

The DSC 29 includes: as shown in FIG. 9, the variable magnification optical system OS, a flash FL, an optical system driving unit 11, a Vibration-proof unit 12, an image sensor SR, a signal processing part 14, a display part 15, a recording part 16, a recording medium 17, an operation part 18, and a control part 21.

The variable magnification optical system OS guides light from a photographing target (on the object side) to the image sensor SR, and also images this light on the light receiving surface (image surface) of the image sensor SR. Therefore, this variable magnification optical system OS may also be expressed as an imaging optical system or an image-taking optical system. Details of the variable magnification optical system OS will be described later.

The flash FL is a light source which irradiates a subject with rays of light to increase light from the subject (reflected light), thereby facilitating image sensing performed by the image sensor SR.

The optical system driving unit 11 has: several driving motors (optical system driving motors), and a transmission mechanism (optical system transmission mechanism) for transmitting driving force of the driving motors to lens groups included in the variable magnification optical system OS (both the driving motors and the transmission mechanism are not shown). The optical system driving unit 11 sets the focal length and the focal position of the variable magnification optical system OS by using the driving motors and the transmission mechanism. More specifically, the optical system driving unit 11, in accordance with instructions provided from the control part 21, sets the focal length and the focal position.

The Vibration-proof unit 12 includes: a shake detection part 12a, a corrected amount calculation part 12b, a vibration-proof lens group driving part 12c, and a corrected amount detection part 12d.

The shake detection part 12a detects the inclination (shake) of the variable magnification optical system OS, and outputs the detection result (a shake signal) to the corrected amount calculation part 12b.

The corrected amount calculation part 12b, based on the inputted shake signal, sets the corrected amount required for Vibration-proof (camera-shake correction). Then, the vibration-proof lens group driving part 12c, in accordance with the corrected amount, moves a lens group for Vibration-proof (vibration-proof lens group) defined in the variable magnification optical system OS by using the driving motor and the transmission mechanism (vibration-proof lens group driving motor and the vibration-proof lens group transmission mechanism), not shown.

The corrected amount detection part 12d detects the vibration-proof lens group which moves for camera-shake correction, and feeds it back.

The image sensor SR is, for example, an area sensor for a CCD (Charge Coupled Device), a CMOS (Complementary Metal Oxide Semiconductor) sensor, or the like, and receives rays of light which have passed through the variable magnification optical system OS and converts them to an electric signal (image sensing data). Then, the image sensor SR outputs this image sensing data to the signal processing part 14.

The signal processing part 14 processes electron data (image sensing data) from the image sensor SR to thereby generate sensed image data based on the image sensing data.

This signal processing part 14, in accordance with instructions provided from of the control part 21, turns on or off processing operation. The signal processing part 14, in accordance with instructions provided from the control part 21, outputs the sensed image data to the display part 15 and the recording part 16.

The display part 15 includes, for example, a liquid crystal panel, and displays sensed image data and the like from the signal processing part 14, the status of use of the DSC 29, and the like.

The recording part 16, in accordance with instructions provided from the control part 21, records on the recording medium 17 the sensed image data generated by the signal processing part 14. The recording part 16, in accordance with instructions from the control part 21 provided in accordance with operation by the operation part 18 or the like, reads the sensed image data from the recording medium 17.

The recording medium 17 may be, for example, of a type which is incorporated inside the DSC 29, or a detachable memory card such as a flash memory or the like. That is, the recording medium 17 may be any medium on which sensed image data and the like can be recorded (optical disk, a semiconductor memory, or the like).

The operation part 18 outputs to the control part 21 various operation instructions provided by the user or the like, and may be composed of, for example, a shutter release button, an operation dial, and the like.

The control part 21 is a center portion which performs operation control and the like of the entire DSC 29, and organically controls driving of various members of the DSC 29 to thereby integrally control the operations.

[2. Variable Magnification Optical System]

[2-1. Configuration of Variable Magnification Optical Systems of Examples 1 and 2]

Here, the variable magnification optical systems OS (Examples 1 and 2) will be described, with reference to the drawings.

The lens sectional views in the drawings (FIGS. 1 and 5) show the variable magnification optical system OS developed in a row. In the drawings, symbol "GRi" denotes a lens group, and symbol "Li" denotes a lens element. Further, symbol "si" denotes a lens surface (transmission surface or the like). A number (i) provided to "GRi", "Li", and "si" denotes a position placed from the object side to the image side. An aspheric surface is suffixed with "*" (asterisk).

[2-1-1. Configuration of the Variable Magnification Optical System of Example 1 (see FIG. 1)]

The variable magnification optical system OS of Example 1 includes, in order from the object side to the image side, a first lens group GR1, a second lens group GR2, a third lens group GR3, and a fourth lens group GR4.

[First Lens Group]

The first lens group GR1 has, in order from the object side, a first lens element L1, an optical prism PR, a second lens element L2, and a third lens element L3. This first lens group GR1 has a "negative (−)" overall optical power (refractive power), where the power is defined by a reciprocal of the focal length.

The lens elements and the optical prism PR have characteristics as described below:

The first lens element L1: is a plano-concave lens element having a flat surface on the object side (where s2* is an aspherical surface);

The optical prism PR: is a prism capable of bending rays of light from the object side at a right angle (for example, a rectangular prism), in which s3 is a surface where rays of light enters and s4 is a surface from which the rays of light exit;

The second lens element L2: is a negative meniscus lens element convex on the object side; and The third lens element L3: is a positive meniscus lens element convex on the object side.

An aspheric surface refers to a refractive optical surface of an aspheric shape, a surface having refracting function equivalent to that of an aspheric surface, or the like. Th second lens element L2 and the third lens element L3 are cemented together on s6 to form a cemented lens element. Adopted as a method of cementing them together is cementing by use of an adhesive or the like (similarly, adopted as a method of cementing to form a different cemented lens element to be described later is also cementing by use of an adhesive or the like).

[Second Lens Group]

The second lens group (vibration-proof lens group) GR2 includes, in order from the object side, an optical aperture stop ST, a fourth lens element L4, a fifth lens element L5, a sixth lens element L6, and a seventh lens element L7. This second lens group GR2 has a "positive (+)" overall optical power.

The optical aperture stop and the lens elements have characteristics as described below:

The optical aperture stop ST: is an aperture stop which partially blocks rays of light which have passed through the first lens group GR1, and is also expressed as s8 (this optical aperture stop ST is integrated with the second lens group GR2;

The fourth lens element L4: is a positive lens element convex on the both sides;

The fifth lens element L5: is a positive lens element convex on the both sides;

The sixth lens element L6: is a negative lens element concave on the both sides; and The seventh lens element: is a positive meniscus lens element convex on the object side (where s14* and s15* are aspheric surfaces).

The fifth lens element L5 and the sixth lens element L6 are cemented together on s12 to thereby form a cemented lens element.

This second lens group GR2 can be moved by the vibration-proof lens unit 12 in a direction substantially orthogonal (vertical direction) to the optical axis AX (optical axis direction).

[Third Lens Group]

The third lens group GR3 includes an eighth lens element L8 and a ninth lens element L9. This third lens group GR3 has a "negative" overall optical power.

The lens elements have characteristics as described below:

The eight lens element L8: is a negative meniscus lens element convex on the object side; and The ninth lens element L9: is a positive meniscus lens element convex on the object side.

The eighth lens element L8 and the ninth lens element L9 are cemented together on s17 to form a cemented lens element.

[Fourth Lens Group]

The fourth lens group GR4 includes a tenth lens element L10 and a lowpass filter LF. This fourth lens group GR4 has a "positive" overall optical power.

The tenth lens element L10 and the low pass filter LF have characteristics as described below:

The tenth lens element L10: is a positive lens element convex on the both sides (where s19* and s20* are aspheric surfaces); and The low pass filter LF: is a filter including two surfaces (s21 and s22), and also an optical filter having a predetermined cutoff frequency characteristic determined by a pixel pitch of the image sensor SR.

[2-1-2. Configuration of the Variable Magnification Optical System of Example 2 (see FIG. 5)]

The variable magnification optical system OS of Example 2 includes, as in Example 1, in order from the object side to the image side, a first lens group GR1, a second lens group GR2, a third lens group GR3, and a fourth lens group GR4. The variable magnification optical system OS of Example 2, as in Example 1, has optical power arrangement "negative, positive, negative, and positive".

[First Lens Group]

The first lens group GR1 includes: in order from the object side, a first lens element L1, an optical prism PR, a second lens element, and a third lens element L3. The lens elements and the optical prism PR have characteristics as described below:

The first lens L1: is a negative meniscus lens element convex on the object side (where s2* is an aspherical surface);

The optical prism PR: is, as in Example 1, a prism capable of bending rays of light from the object side at a right angle, in which s3 is a surface where rays of light enter and the surface s4 is a surface from which the rays of light exit;

The second lens element L2: is a negative meniscus lens element convex on the object side; and The third lens element L3: is a positive meniscus lens element convex on the object side.

The second lens element L2 and the third lens element L3 are cemented together on s6 to form a cemented lens element.

[Second Lens Group]

The second lens group (vibration-proof lens group) GR2 includes: in order from the object side, an optical aperture stop ST, a fourth lens element L4, a fifth lens element L5, a sixth lens element L6, and a seventh lens element L7. The optical aperture stop ST and the lens elements have characteristics as described below:

The optical aperture stop ST: is, as in Example 1, an aperture stop which partially blocks rays of light which have passed through the first lens group GR1, and is also expressed as s8 (this optical aperture stop ST is integrated together with the second lens group GR2);

The fourth lens element L4: is a positive lens element convex on the both sides;

The fifth lens element L5: is a positive lens element convex on the both sides;

The sixth lens element L6: is a negative lens element concave on the both sides; and The seventh lens element: is a positive lens element convex on the both sides (where s14* and s15* are aspheric surfaces).

The fifth lens element L5 and the sixth lens element L6 are cemented together on s12 to form a cemented lens element.

This second lens group GR2 can be moved by the vibration-proof lens unit 12 in the direction substantially orthogonal to the optical axis AX.

[Third Lens Group]

The third lens group GR3 includes an eighth lens element L8 and a ninth lens element L9. The lens elements have characteristics described below:

The eighth lens element L8: is a negative lens element concave on the both sides; and The ninth lens element L9: is a positive meniscus lens element convex on the object side.

The eighth lens element L8 and the ninth lens element L9 are cemented together on s17 to form a cemented lens element.

[Fourth Lens Group]

The fourth lens group GR4 includes a tenth lens element L10 and a lowpass filter LF. This tenth lens element L10 and the lowpass filter LF have characteristics described below:

The tenth lens element: is a positive lens element convex on the both sides (where s19* and s20* are aspheric surfaces); and The lowpass filter LF: is a filter including two surfaces (s21 and s22), and also, as in Example 1, an optical filter having a predetermined cutoff frequency characteristic determined by a pixel pitch of the image sensor SR.

[2-2. Construction Data for the Variable Magnification Optical Systems of Examples 1 and 2]

Next, construction data for the variable magnification optical systems of Examples 1 and 2 will be described with reference to Tables 1 to 4.

Symbol ri in these tables denotes a radius of curvature (in mm) of each surface (si). An aspherical surface is suffixed with an asterisk (*). Symbol di denotes an axial surface distance (in mm) between the i-th surface (si) and the (i+1)-th surface (si+1).

In a case where the axial surface distance (intergroup distance) varies by zooming, di at the wide-angle end position (W), di at the intermediate focal length position (M), and di at the telephoto end position (T) are indicated in this order.

Symbols Ni and υi denote the refractive index (Nd) and Abbe number (vd) possessed by a medium at the axial surface distance (di). The refractive index (Nd) and the Abbe number (vd) are provided for a d-line (wavelength 587.56 nm).

The "focal length position" implies the wide-angle end (W; shortest focal length position) to the intermediate focal length position (M) to the telephoto end (T; longest focal length position). Numerals f, FNO, and "2ω" denote the focal length (in mm), f-number, and an angle of view, respectively, of the entire system corresponding to the respective focal length position (W), (M), and (T).

The aspherical surface described above is defined by formula below (definitional equation 1):

$$X(H)=C_0 \cdot H^2/(1+\sqrt{1-\epsilon \cdot C_0^2 \cdot H^2})+\Sigma Aj \cdot H^j \quad \text{(Definitional equation 1)},$$

where

H denotes the height in the direction perpendicular to the optical axis AX;

X (H) denotes the displacement in the direction of the optical axis AX at the height H;

$C_0$ denotes the paraxial curvature (=1/ri);

$\epsilon$ denotes the quadric surface parameter;

j denotes the order of the aspherical surface; and

Aj denotes the aspherical surface coefficient of order j.

Tables 2, and 4 show data on the aspherical surfaces (aspherical surface data). Here, it should be noted that the coefficient of any term that does not appear in the tables equals zero, and that, for all the data, E-n stands for $\times 10^{-n}$.

[2-3. Movement of Each Lens Group in the Variable Magnification Optical Systems of Examples 1 and 2]

Upon zooming from the wide angle end (W) to the telephoto end (T) or the like (magnification variation or the like), the variable magnification optical system OS moves the lens groups GRs along the optical axis AX.

Figure 1:
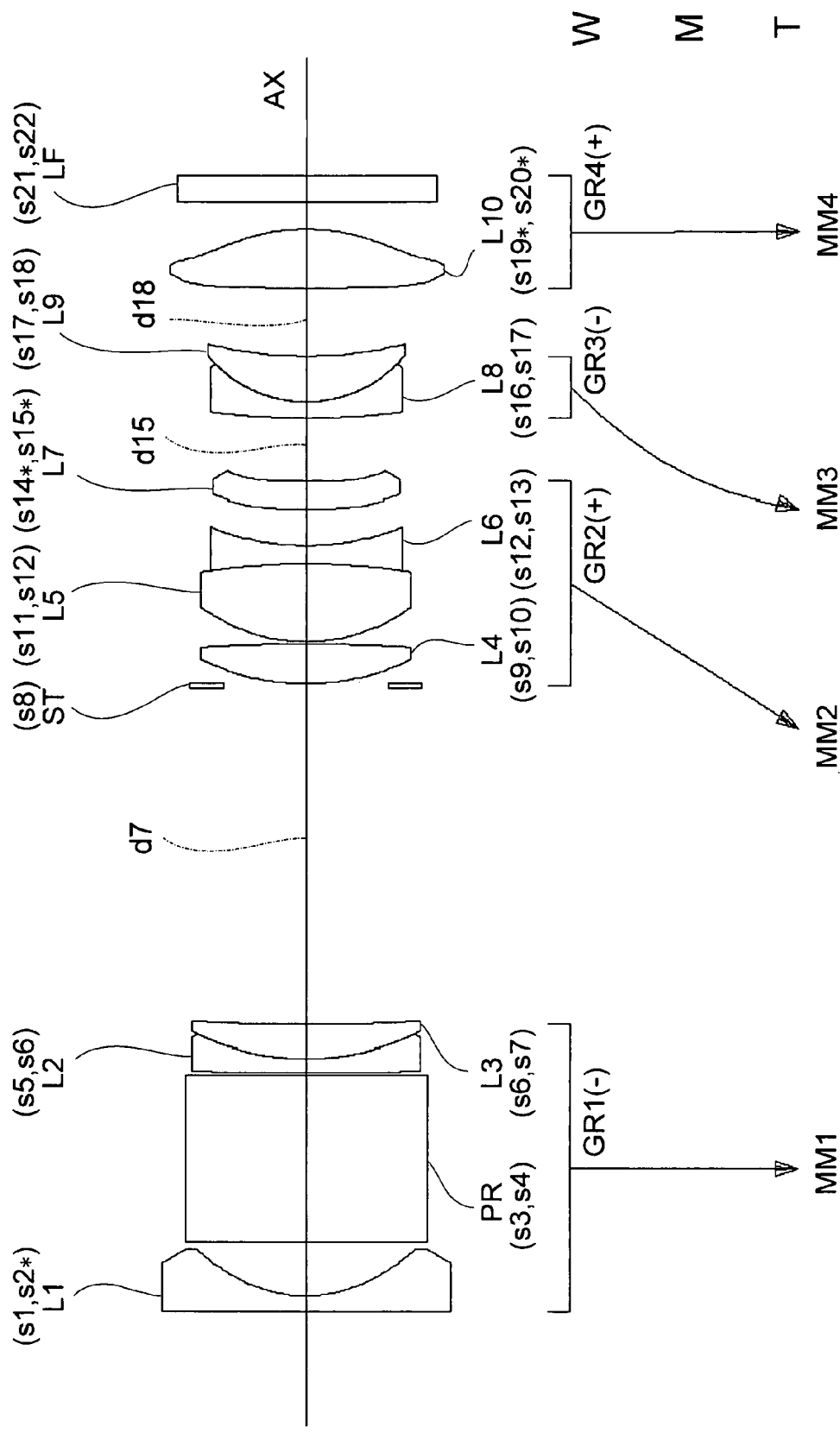
FIG. 1 is a lens sectional view with a variable magnification optical system of Example 1 developed in a row.
Figure 5:
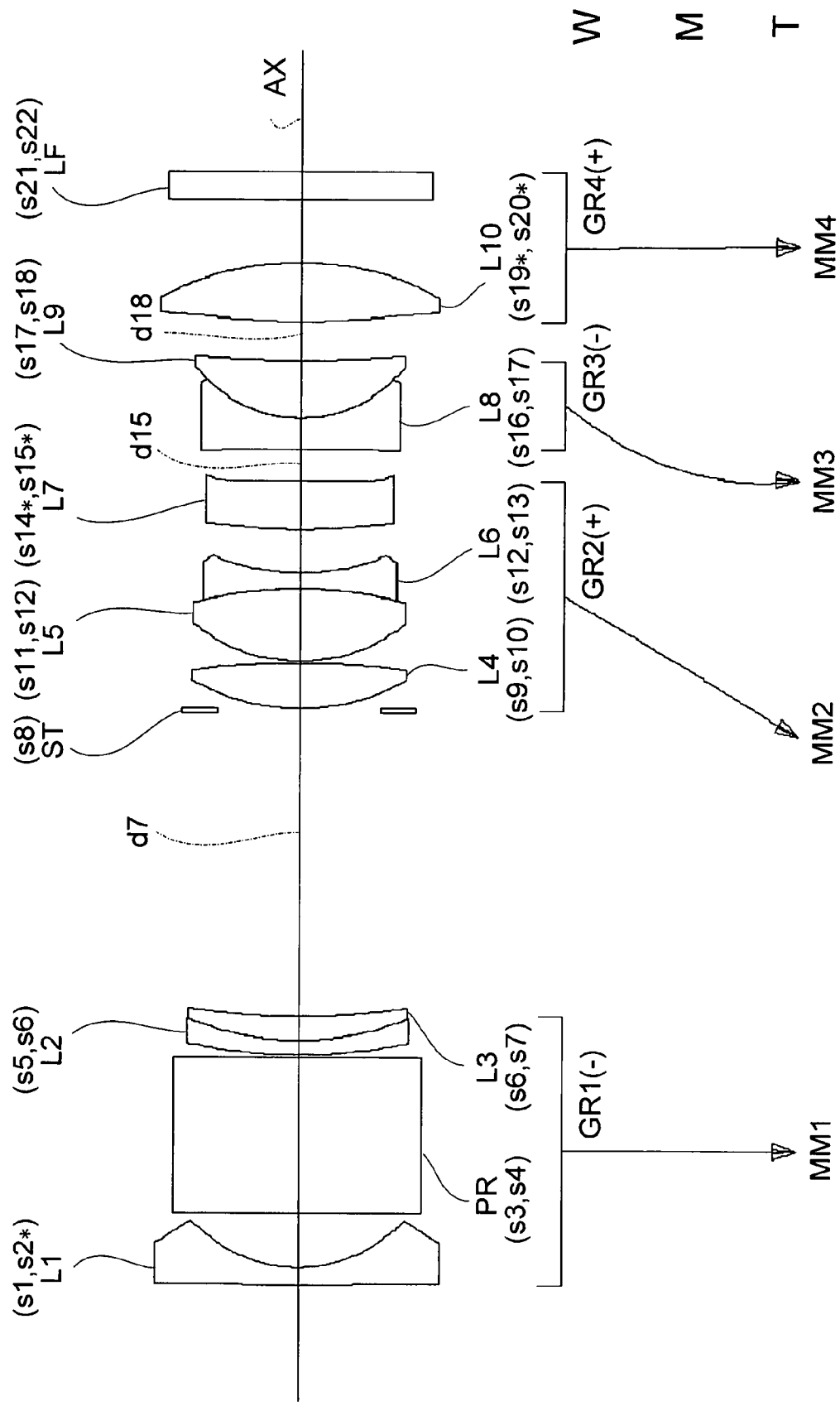
FIG. 5 is a lens sectional view with a variable magnification optical system of Example 2 developed in a row.
Figure 6A:
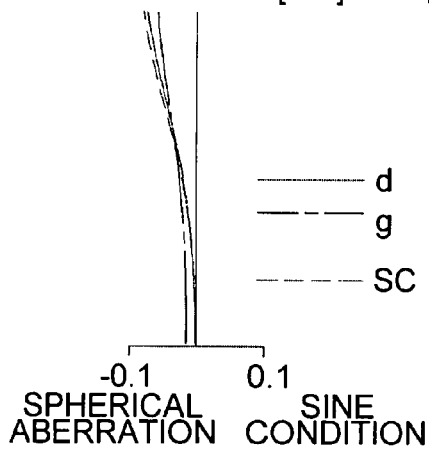
FIG. 6A is an aberration diagram showing spherical aberration at the wide angle end (W) in zooming performed with the variable magnification optical system of Example 2.
Figure 6B:
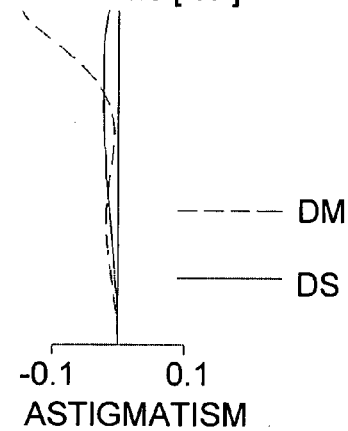
FIG. 6B is an aberration diagram showing astigmatism at the wide angle end (W) in zooming performed with the variable magnification optical system of Example 2.
Figure 6C:
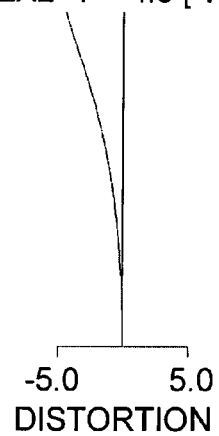
FIG. 6C is an aberration diagram showing distortion at the wide angle end (W) in zooming performed with the variable magnification optical system of Example 2.
Figure 6D:
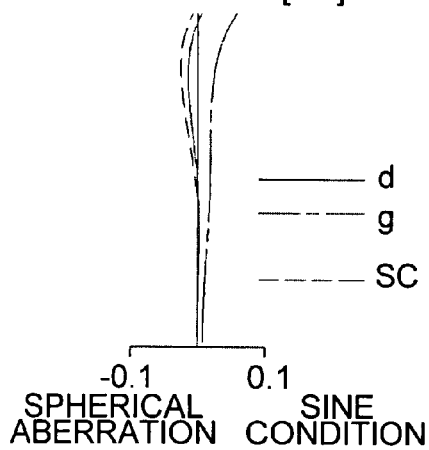
FIG. 6D is an aberration diagram showing spherical aberration at the intermediate focal length position (M) in zooming performed with the variable magnification optical system of Example 2.
Figure 6E:
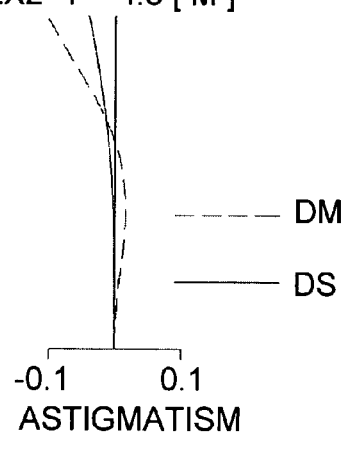
FIG. 6E is an aberration diagram showing astigmatism at the intermediate focal length position (M) in zooming performed with the variable magnification optical system of Example 2.
Figure 6F:
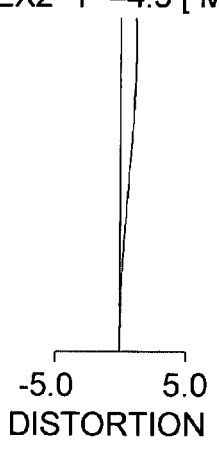
FIG. 6F is an aberration diagram showing distortion at the intermediate focal length position (M) in zooming performed with the variable magnification optical system of Example 2.
Figure 6G:
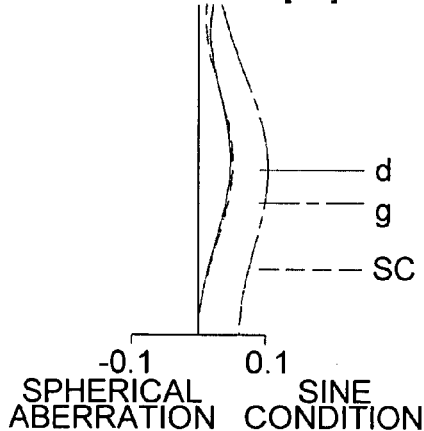
FIG. 6G is an aberration diagram showing spherical aberration at the telephoto end (T) in zooming performed with the variable magnification optical system of Example 2.
Figure 6H:
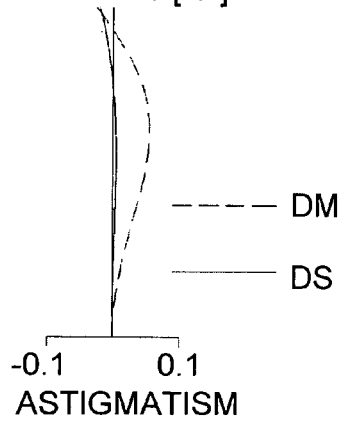
FIG. 6H is an aberration diagram showing astigmatism at the telephoto (T) end in zooming performed with the variable magnification optical system of Example 2.
Figure 6I:
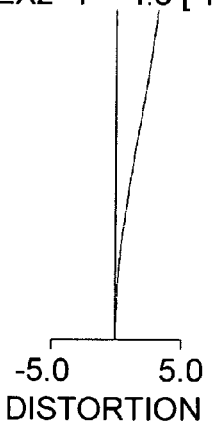
FIG. 6I is an aberration diagram showing distortion at the telephoto end (T) in zooming performed with the variable magnification optical system of Example 2.
Figure 7A:
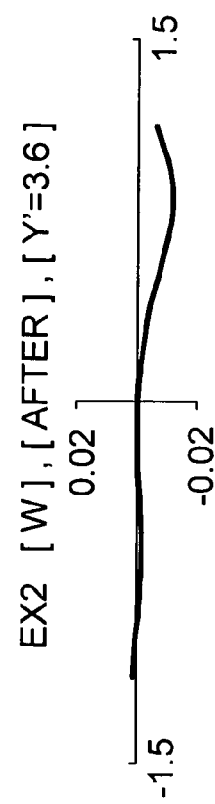
FIG. 7A is a lateral aberration diagram at the wide angle end (W) for the variable magnification optical system of Example 2 before movement of a second lens group (where Y'=3.6)
Figure 7B:
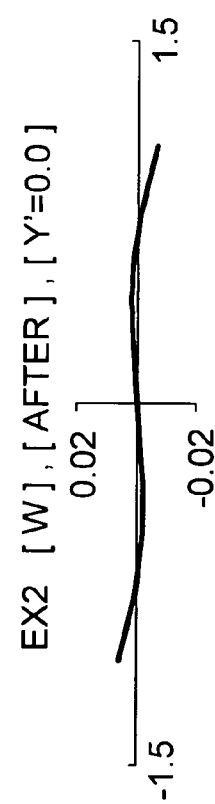
FIG. 7B is a lateral aberration diagram at the wide angle end (W) for the variable magnification optical system of Example 2 before movement of the second lens group (where Y'=0.0)
Figure 7C:
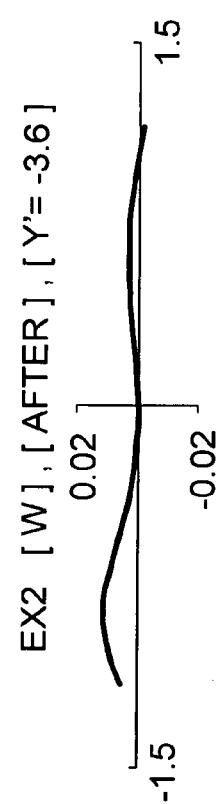
FIG. 7C is a lateral aberration diagram at the wide angle end (W) for the variable magnification optical system of Example 2 before movement of the second lens group (where Y'=−3.6)
Figure 7D:
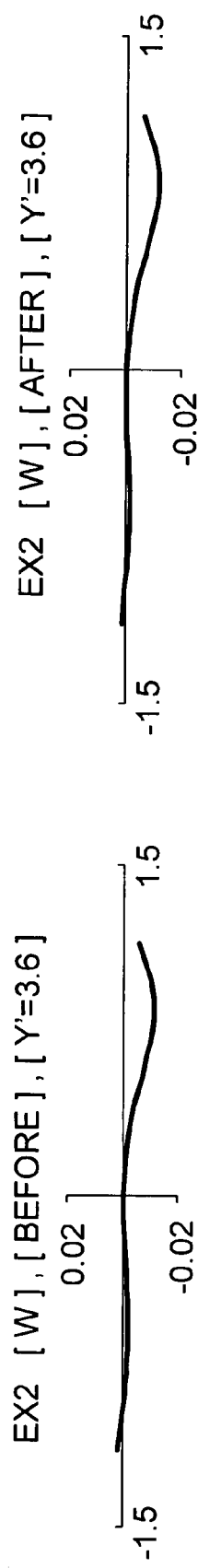
FIG. 7D is a lateral aberration diagram at the wide angle end (W) for the variable magnification optical system of Example 2 after movement of the second lens group (where Y'=3.6)
Figure 7E:
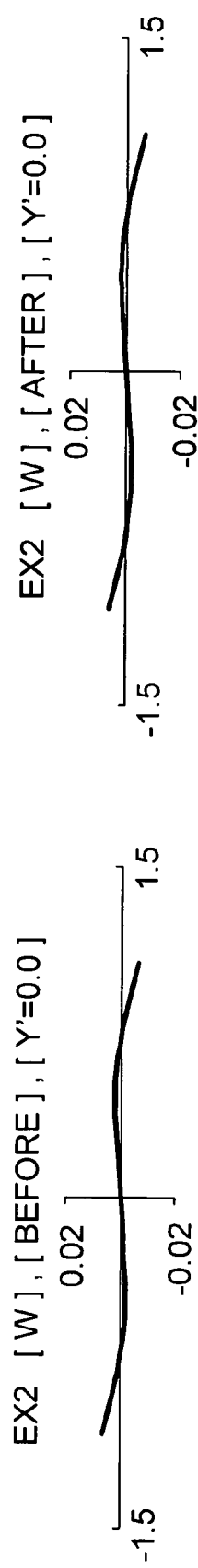
FIG. 7E is a lateral aberration diagram at the wide angle end (W) for the variable magnification optical system of Example 2 after movement of the second lens group (where Y'=0.0)
Figure 7F:
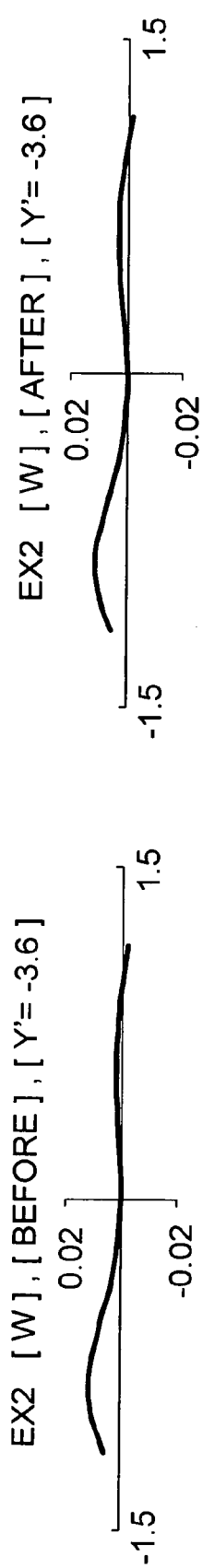
FIG. 7F is a lateral aberration diagram at the wide angle end (W) for the variable magnification optical system of Example 2 after movement of the second lens group (where Y'=−3.6)
Figure 8A:
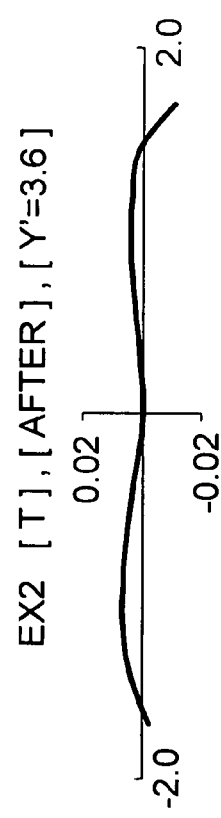
FIG. 8A is a lateral aberration diagram at the telephoto end (T) for the variable magnification optical system of Example 2 before movement of the second lens group (where Y'=3.6)
Figure 8B:
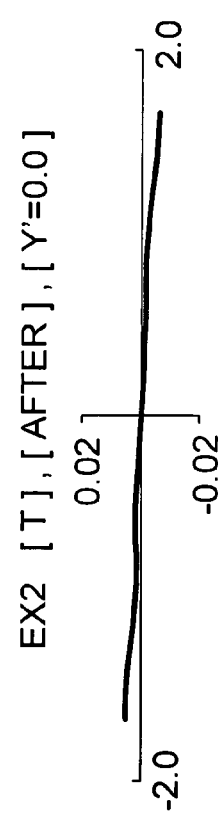
FIG. 8B is a lateral aberration diagram at the telephoto end (T) for the variable magnification optical system of Example 2 before movement of the second lens group (where Y'=0.0)
Figure 8C:
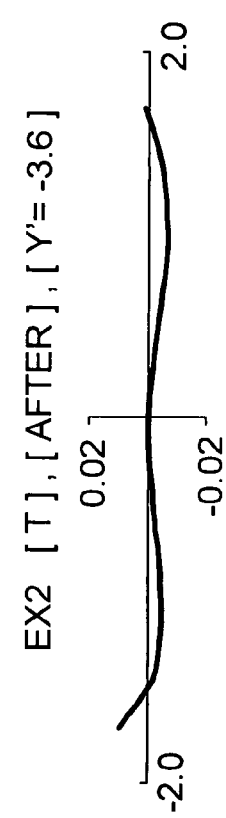
FIG. 8C is a lateral aberration diagram at the telephoto end (T) for the variable magnification optical system of Example 2 before movement of the second lens group (where Y'=−3.6)
Figure 8D:
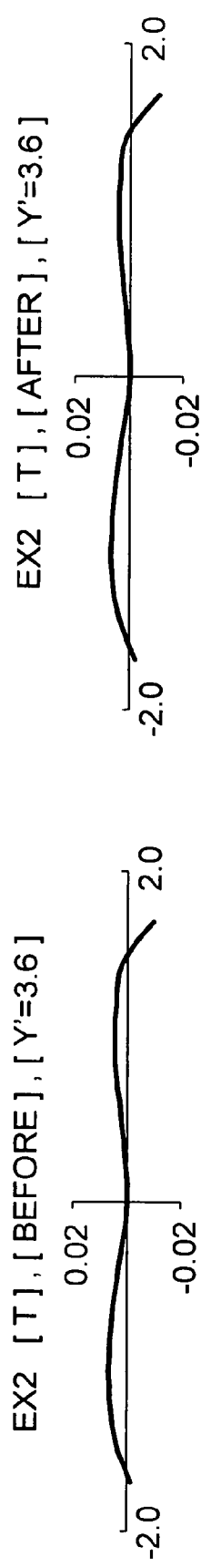
FIG. 8D is a lateral aberration diagram at the telephoto end (T) for the variable magnification optical system of Example 2 after movement of the second lens group (where Y'=3.6)
Figure 8E:
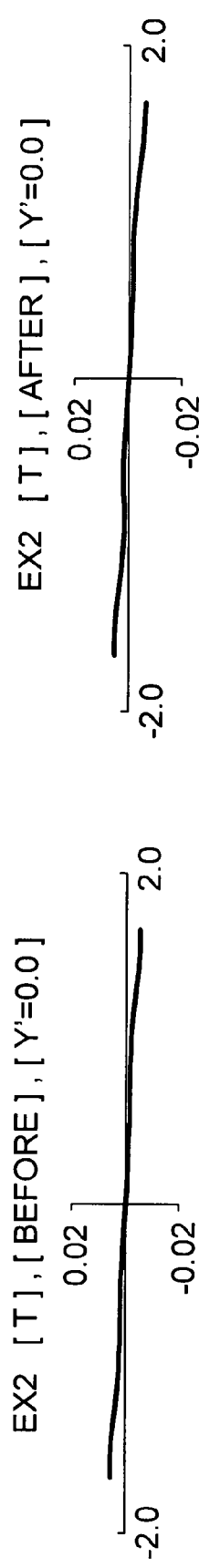
FIG. 8E is a lateral aberration diagram at the telephoto end (T) for the variable magnification optical system of Example 2 after movement of the second lens group (where Y'=0.0)
Figure 8F:
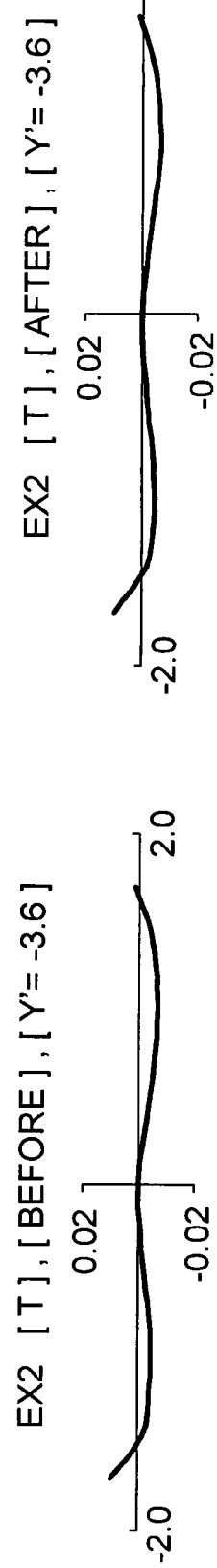
FIG. 8F is a lateral aberration diagram at the telephoto end (T) for the variable magnification optical system of Example 2 after movement of the second lens group (where Y'=−3.6)

In FIGS. 1 and 5, only the axial surface distances (di) where interval fluctuation occurs following the zooming operation are numbered. An arrow "MMi" in the figures schematically indicates the locus of each lens group GR from the wide angle end (W) to the intermediate focal length position (M), and further from the intermediate focal length position (M) to the telephoto end (T). The symbol i in MMi denotes the position placed from the object side to the image side, and thus corresponds to the position of the respective lens group GR.

The movement of each lens group GR from the wide angle end (W) to the telephoto end (T) is as described below. The interval between the lens groups GR (group interval) is expressed through comparison between the interval at the wide angle end (W) and the interval at the telephoto end (T). Therefore, even if the interval at the intermediate focal length position position (M) is narrower than the interval at the wide angle end (W), as long as the interval at the telephoto end (T) is wider than the interval at the wide angle end (W), the interval concerned can be expressed as increasing before reaching from the wide angle end (W) to the telephoto end (T).

[2-3-1. Variable Magnification Optical Systems of Examples 1 and 2]

The first lens group GR1: is immobile, more specifically, fixed with respect to the image surface of the image sensor SR;

The second lens group GR2: moves toward the object side;

The third lens group GR3: moves toward the object side, more specifically, leaves convex movement locus toward the object side so that the interval between the second lens group GR and the third lens group GR3 becomes minimum near the intermediate focal distance position (M); and The forth lens group GR4: is immobile, and, as the first lens group GR1, fixed with respect to the image surface of the image sensor SR.

The variable magnification optical systems OS of Examples 1 and 2, in zooming from the wide angle end (W) to the telephoto end (T), narrows down the interval between the first lens group GR1 and the second lens group GR2, widens the interval between the second lens group GR2 and the third lens group GR3, widens the interval between the third lens group GR3 and the fourth lens group GR4.

[2-4. Aberration in the Variable Magnification Optical Systems of Examples 1 to 3]

[2-4-1. Spherical Aberration, Astigmatism, and Distortion]

FIGS. 2A to 2I and 6A to 6I show spherical aberration, astigmatism, and distortion in the variable magnification optical systems of Examples 1 and 2 during zooming. FIGS. 6A to 6I are expressed in the same manner as FIGS. 2A to 2I.

Figure 2A:
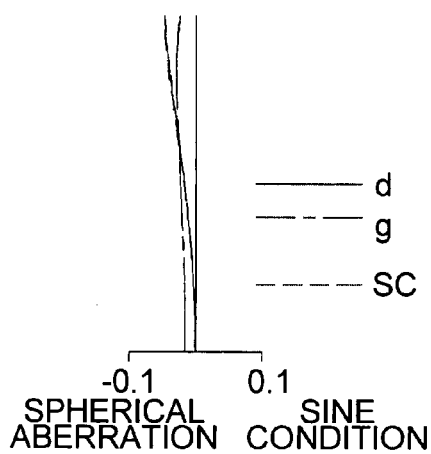
FIG. 2A is an aberration diagram showing spherical aberration at the wide angle end (W) in zooming performed with the variable magnification optical system of Example 1.
Figure 2B:
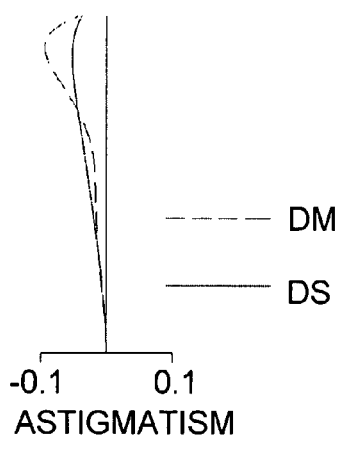
FIG. 2B is an aberration diagram showing astigmatism at the wide angle end (W) in zooming performed with the variable magnification optical system of Example 1.
Figure 2C:
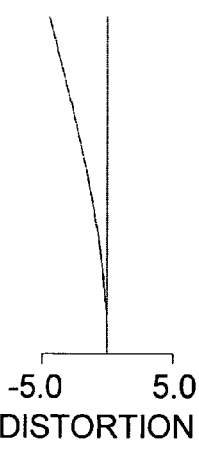
FIG. 2C is an aberration diagram showing distortion at the wide angle end (W) in zooming performed with the variable magnification optical system of Example 1.
Figure 2D:
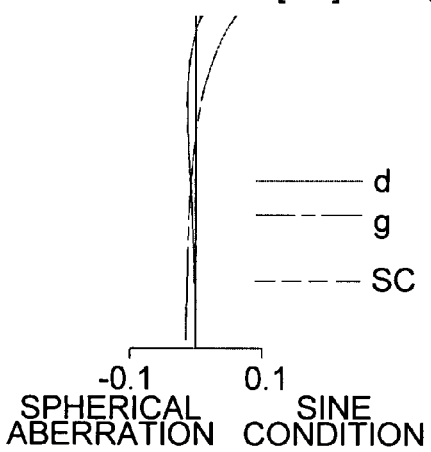
FIG. 2D is an aberration diagram showing spherical aberration at the intermediate focal length position (M) in zooming performed with the variable magnification optical system of Example 1.
Figure 2E:
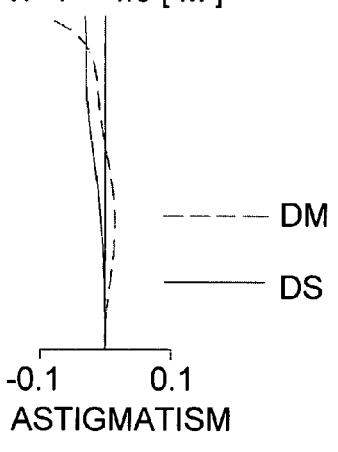
FIG. 2E is an aberration diagram showing astigmatism at the intermediate focal length position (M) in zooming performed with the variable magnification optical system of Example 1.
Figure 2F:
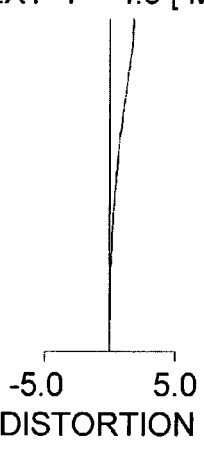
FIG. 2F is an aberration diagram showing distortion at the intermediate focal length position (M) in zooming performed with the variable magnification optical system of Example 1.
Figure 2G:
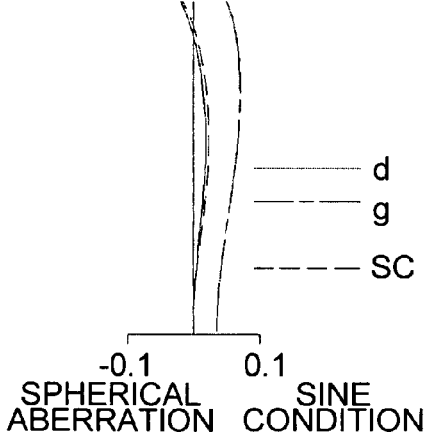
FIG. 2G is an aberration diagram showing spherical aberration at the telephoto end (T) in zooming performed with the variable magnification optical system of Example 1.
Figure 2H:
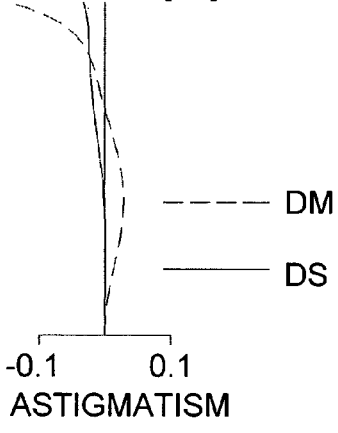
FIG. 2H is an aberration diagram showing astigmatism at the telephoto (T) end in zooming performed with the variable magnification optical system of Example 1.
Figure 2I:
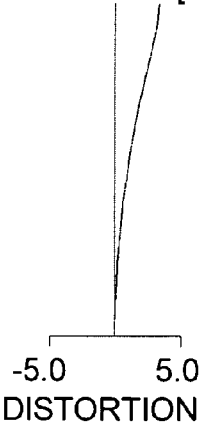
FIG. 2I is an aberration diagram showing distortion at the telephoto end (T) in zooming performed with the variable magnification optical system of Example 1.
Figure 3A:
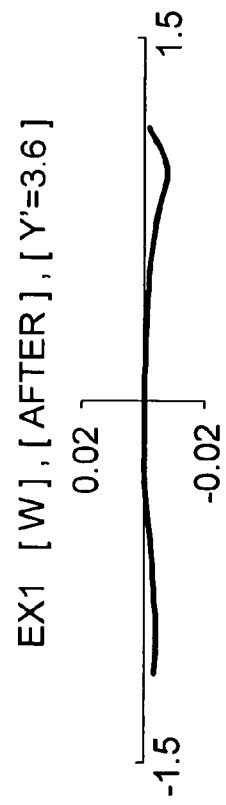
FIG. 3A is a lateral aberration diagram at the wide angle end (W) in the variable magnification optical system of Example 1 before movement of a second lens group (where Y'=3.6)
Figure 3B:
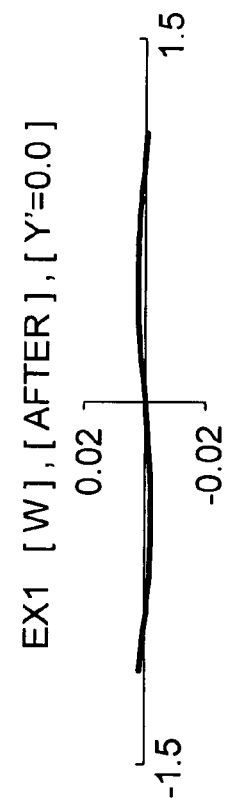
FIG. 3B is a lateral aberration diagram at the wide angle end (W) in the variable magnification optical system of Example 1 before movement of the second lens group (where Y'=0.0)
Figure 3C:
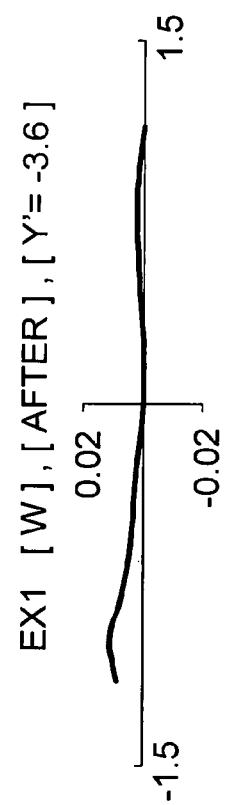
FIG. 3C is a lateral aberration diagram at the wide angle end (W) in the variable magnification optical system of Example 1 before movement of the second lens group (where Y'=−3.6)
Figure 3D:
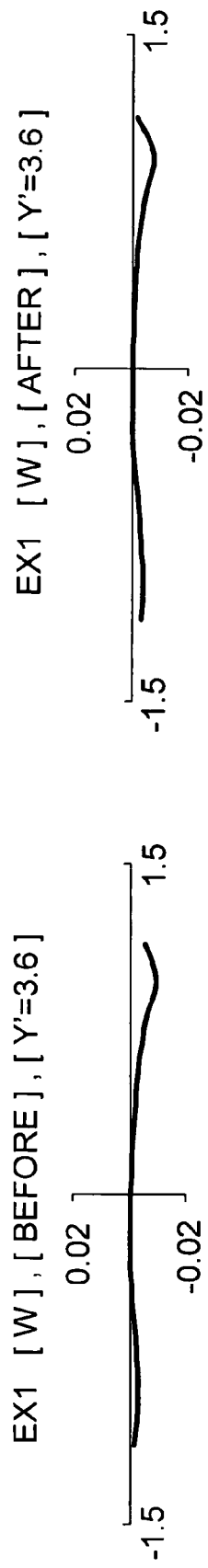
FIG. 3D is a lateral aberration diagram at the wide angle end (W) in the variable magnification optical system of Example 1 after movement of the second lens group (where Y'=3.6)
Figure 3E:
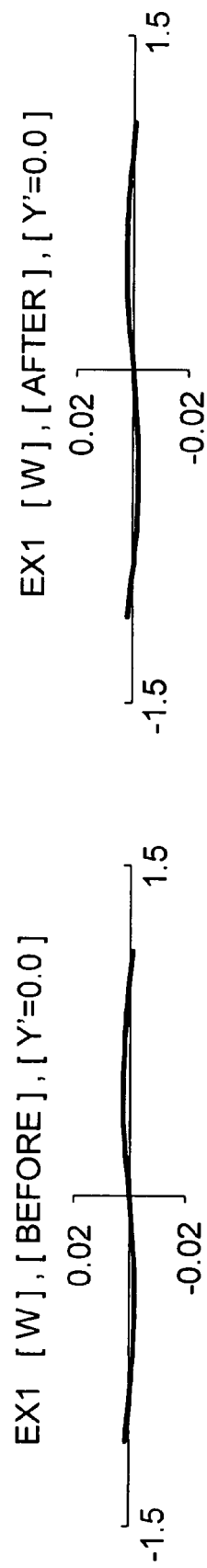
FIG. 3E is a lateral aberration diagram at the wide angle end (W) in the variable magnification optical system of Example 1 after movement of the second lens group (where Y'=0.0)
Figure 3F:
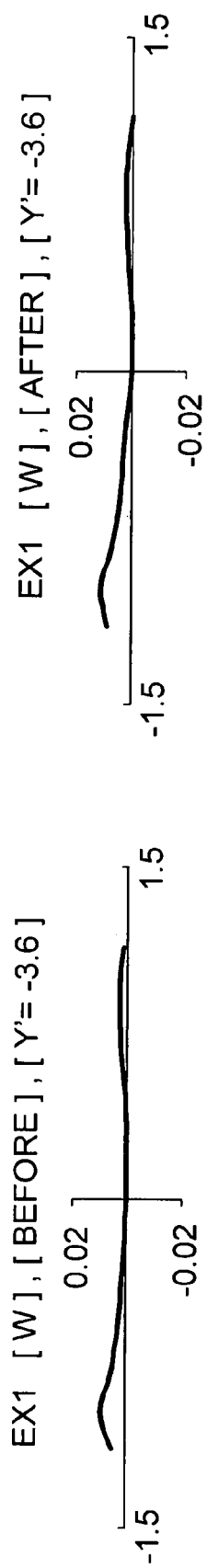
FIG. 3F is a lateral aberration diagram at the wide angle end (W) in the variable magnification optical system of Example 1 after movement of the second lens group (where Y'=−3.6)
Figure 4D:
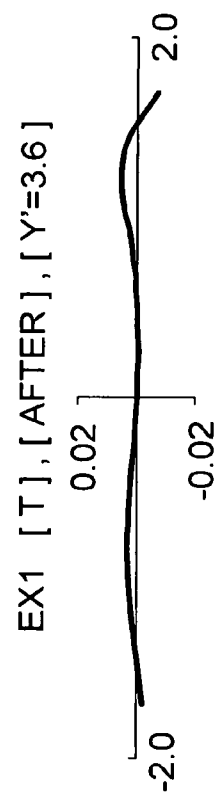
FIG. 4D is a lateral aberration diagram at the telephoto end (T) in the variable magnification optical system of Example 1 after movement of the second lens group (where Y'=3.6)
Figure 4E:
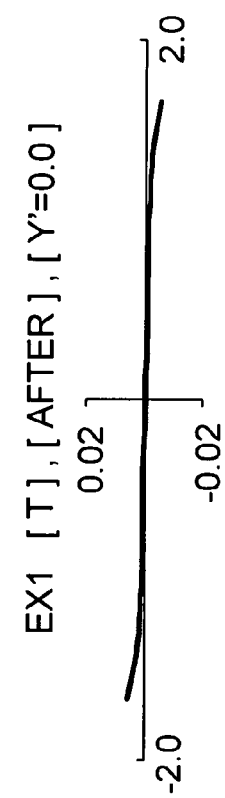
FIG. 4E is a lateral aberration diagram at the telephoto end (T) in the variable magnification optical system of Example 1 after movement of the second lens group (where Y'=0.0)
Figure 4F:
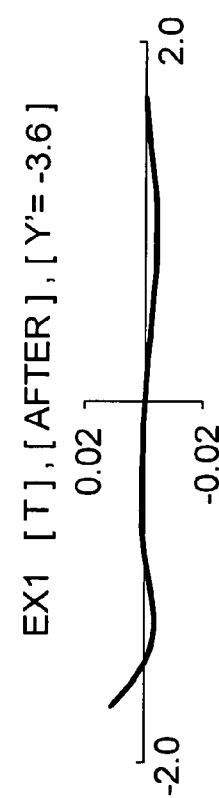
FIG. 4F is a lateral aberration diagram at the telephoto end (T) in the variable magnification optical system of Example 1 after movement of the second lens group (where Y'=−3.6)
Figure 4A:
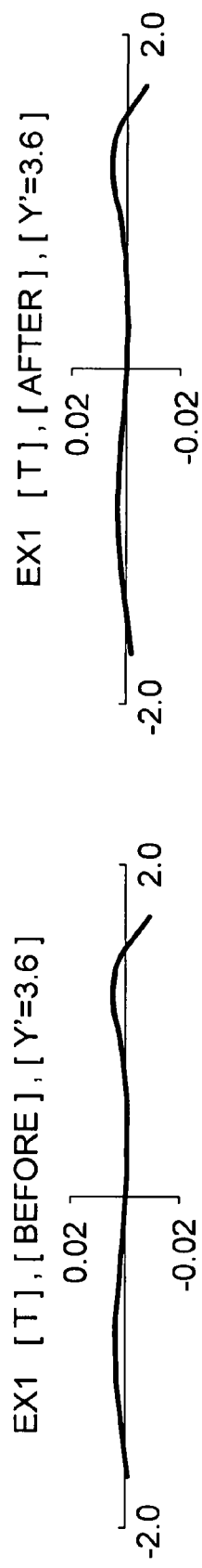
FIG. 4A is a lateral aberration diagram at the telephoto end (T) in the variable magnification optical system of Example 1 before movement of the second lens group (where Y'=3.6)
Figure 4B:
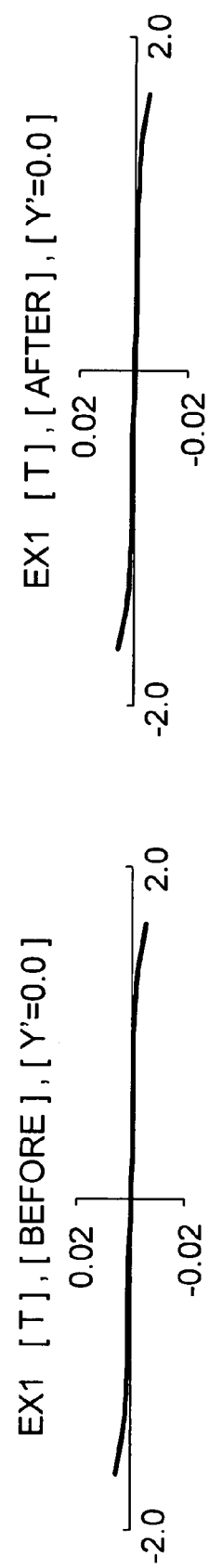
FIG. 4B is a lateral aberration diagram at the telephoto end (T) in the variable magnification optical system of Example 1 before movement of the second lens group (where Y'=0.0)
Figure 4C:
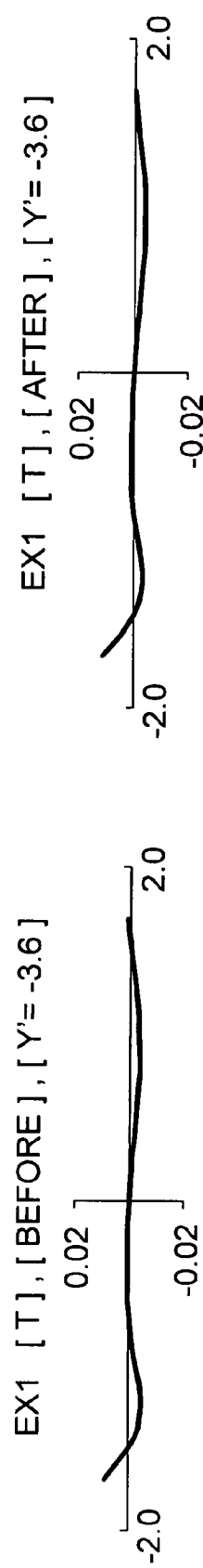
FIG. 4C is a lateral aberration diagram at the telephoto end (T) in the variable magnification optical system of Example 1 before movement of the second lens group (where Y'=−3.6)

More specifically, FIGS. 2A to 2C show aberration at the wide angle end (W), FIGS. 2D to 2F show aberration at the intermediate focal length position (M), and FIGS. 2G to 2I show aberration at the telephoto end (T).

FIGS. 2A, 2D, and 2G show spherical aberration and sine condition. In these figures, the vertical axis denotes the incidence height, and the lines denote the following (note that FNo. is also indicated):

d-line (solid line): denotes spherical aberration (in mm) for d-line (wavelength 587.6 nm);

g-line (dashed line): denotes spherical aberration (in mm) for g-line (wavelength 435.8 nm); and SC-line (broken line): denotes the degree of deviation from sine condition (in mm).

FIGS. 2B, 2E, and 2H show astigmatism. In these figures, the vertical axis denotes the maximum image height (Y' in mm), and the lines denote the following:

DM-Line (broken line): denotes astigmatism (in mm) for d-line on the meridional surface; and DS-line (solid line): denotes astigmatism (in mm) for d-line on the sagittal surface.

FIGS. 2C, 2F, and 2I show distortion. In these figures, the vertical axis denotes the maximum image height (Y' in mm), and the solid line denotes distortion for d-line (in %).

[2-4-2. Lateral Aberration]

FIGS. 3A to 3F, 4A to 4F, 7A to 7F, and 8A to 8F show lateral aberration in the variable magnification optical systems of Examples 1 to 3 during zooming. FIGS. 7A to 7F and 8A to 8F are expressed in the same manner as FIGS. 3A to 3F and 4A to 4F.

More specifically, FIGS. 3A to 3F show the lateral aberration at the wide angle end (W), and FIGS. 4A to 4F show the lateral aberration at the telephoto end (T). In particular, FIGS. 3A to 3F and 4A to 4F show the lateral aberration separately before and after movement of the second lens group GR2 in the direction substantially orthogonal to the optical axis AX. More specifically, in FIGS. 3A to 3F and 4A to 4F, FIGS. 3A to 3C (FIGS. 4A to 4C) show the lateral aberration before the movement of the second lens group GR2, and FIGS. 3D to 3F (FIGS. 4D to 4F) show the lateral aberration after the movement of the second lens group GR2.

In these figures, the vertical axis denotes the degree of aberration (in mm) and the horizontal axis denotes the position on the incidence pupil through which each ray of light passes (in mm). The angle of camera-shake correction is 0.5 degrees at the wide angle end (W) and 0.2 degrees at the telephoto end (T).

[3. One Example of Various Characteristics]

As described above, the variable magnification optical system OS has a plurality of lens groups GR for imaging light from the object side on the image surface of the image sensor SR. In the variable magnification optical system OS of all the examples, the plurality of lens groups GR include at least: in order from the object side to the image side, the first lens group GR1 having a negative optical power, the second lens group GR2 having a positive optical power, the third lens group GR3 having a negative optical power, and the fourth lens group GR4 having a positive optical power.

In the variable magnification optical system OS, in zooming from the wide angle end (W) to the telephoto end (T), in the optical axis direction, the first lens group GR1 and the fourth lens group GR4 are immobile with respect to the image surface, but the second lens group GR2 and the third lens group GR3 move. Specifically, the second lens group GR2 and the third lens group GR3 move so that the interval between the first lens group GR1 and the second lens group GR2 decreases, the interval between the second lens group GR2 and the third lens group GR3 increases, and the interval between the third lens group GR3 and the fourth lens group GR4 increases.

Moreover, in zooming from the wide angle end (W) to the telephoto end (T), the variable magnification optical system OS moves the second lens group GR2 in the in-surface direction vertical to the optical axis direction to thereby correct shake resulting from imaging on the image surface (correct camera-shake).

Specifically, such a variable magnification optical system OS moves the second lens group GR2 located relatively distant from the image sensor SR (image surface) to thereby correct camera-shake. Therefore, the length of the optical path from the second lens group GR2 to the image surface is longer than, for example, the length of the optical path from the third lens group GR3 to the image surface. Such a long optical path may make it easy to appropriately set the degree of sensitivity to decentering (the ratio of the amount of movement of an image point on the image surface with respect to the amount of movement of the vibration-proof lens group).

Generally, a too small degree of sensitivity to decentering requires a larger amount of movement of the vibration-proof lens group, which results in a larger thrust force of a motor or the like (vibration-proof lens group driving motor) which moves the vibration-proof lens group. On the other hand, a too large degree of sensitivity to decentering results in a smaller amount of movement of the vibration-proof lens group, but requires a higher accuracy of setting this amount of movement (that is, corrected amount). Thus, the corrected amount calculation part 12b and the corrected amount detection part 12d need to be provided with high accuracy.

However, the variable magnification optical system OS which moves the second lens group GR2 can appropriately set the degree of sensitivity to decentering by using the relatively large optical path. Therefore, a vibration-proof lens group driving motor with a relatively small thrust force (that is small-size vibration-proof lens group driving motor) can be adopted. Thus, this permits easy arrangement of the vibration-proof lens group driving motor, a vibration-proof lens group transmission mechanism, and the like in space provided around the second lens group GR2. Therefore, this variable magnification optical system OS is suitable for being loaded in a compact DSC 29.

The variable magnification optical system OS capable of appropriately setting the degree of sensitivity to decentering does not have to adopt the corrected amount calculation part 12b and the corrected amount detection part 12d with excessively high accuracy. That is, a low-cost corrected amount calculation part 12b and corrected amount detection part 12d with relatively low accuracy may be adopted, thus achieving cost reduction of the small-size DSC 29 loading such a variable magnification optical system OS.

Since the second lens group GR2 as a vibration-proof lens group moves in the in-surface direction vertical to the optical axis direction, aberration accompanying the movement (decentering), that is, decentering aberration occurs. This decentering aberration is easily influenced by the positive optical power of the second lens group GR2. Specifically, with an excessively strong positive optical power, decentering aberration is likely to occur. Thus, it is preferable that the variable magnification optical system OS fulfill conditional formula (1) below. This conditional formula (1) defines balance between suppressing decentering aberration attributable to the second lens group G2 and shortening the full length of the variable magnification optical system OS.

$$1.7 \leq f2/Y'\text{max} \leq 2.7 \qquad \text{Conditional formula (1)},$$

where f2: denotes the focal length (in mm) of the second lens group GR2; and

Y'max: denotes the maximum image height (in mm) on the image surface.

For example, if the value of f2/Y'max is smaller than the lower limit of the conditional formula (1) because the focal length of the second lens group GR2 is short and the maximum image height is large, the variable magnification optical system achieves satisfactorily higher angle while the positive optical power of the second lens group GR2 is relatively strong. Thus, the interval between the second lens group and the third lens group GR3 can be narrowed, thus resulting in a short full length of the variable magnification optical system OS. However, due to the relatively strong positive optical power of the second lens group GR2, decentering aberration attributable to the second lens group GR2 is likely to occur.

On the other hand, for example, if the value of f2/Y'max is larger than the upper limit of the conditional formula (1) because the focal length of the second lens group GR2 is long and the maximum image height is small, the variable magnification optical system OS fails to achieve satisfactorily higher angle but the positive optical power of the second lens group GR2 is relatively weak. Thus, decentering aberration attributable to the second lens group GR2 is less likely to occur. However, due to the relatively weak positive optical power of the second lens group GR2, the interval the interval between the second lens group and the third lens group GR3 is wide, thus resulting in a long full length of the variable magnification optical system OS.

Therefore, setting the focal length and maximum image height of the second lens group GR2 so that they fall within the range of the conditional formula (1) suppresses decentering aberration attributable to the second lens group GR2 and also reduces the full length of the variable magnification optical system OS.

Results of the conditional formula (1) are shown below in correspondence with the variable magnification optical systems OS of Examples 1 and 2:

Example 1: 2.562 (where f2 is equal to 11.530 mm and Y'max is equal to 4.5 mm); and Example 2: 2.388 (where f2 is equal to 10.744 mm and Y'max is equal to 4.5 mm).

It is further preferable that, within the conditional range defined by the conditional formula (1), a range of conditional formula (1)' below be fulfilled:

$$2.0 \leq f2/Y'\text{mmax} \leq 2.6 \qquad \text{Conditional formula (1)'}.$$

To suppress decentering aberration attributable to the second lens group GR2, it is preferable that various aberration in the second lens group be suppressed. Thus, the second lens group GR2 includes at least: from the object side to the image side, the positive lens element having a surface convex on the object side (fourth lens element L4), a cemented lens element formed by cementing together the positive lens element having a surface convex on the object side (fifth lens element L5) and the negative lens element having a surface concave on the image side (sixth lens element L6), and the positive lens element having an aspheric surface (seventh lens element L7).

Such a second lens group GR2 converges axial rays by the positive lens element located on the most object side and having a surface convex on the object side, and guides it to the cemented lens element. Thus, the axial rays, which enter the cemented lens element, enter this lens element at position relatively close to the optical axis (the height of axial rays (axial height) becomes low). Consequently, under the influence of rays of a low axial height combined with the correcting action of the cemented lens element, spherical aberration is suppressed (corrected). Moreover, axial rays exiting form the cemented lens element enter the positive lens element having an aspheric surface, thereby suppressing curvature of field. Therefore, this second lens group GR2 can correct various aberration efficiently. Thus, even when this lens group GR2 moves for camera-shake correction, decentering aberration is less likely to occur in the variable magnification optical system OS.

With a lens element having an aspheric surface, curvature of field is efficiently corrected. Thus, the lens element located on the most image side of the second lens group GR2 may be either a positive lens element or a negative lens element as long as it has an aspheric surface.

Other Embodiments

The invention is not limited to the embodiment described above, and thus various modifications can be made within the range not departing from the spirit of the invention.

For example, to achieve downsizing of the variable magnification optical system OS, an optical prism PR or a reflective mirror which changes the optical axis direction through reflection may be included in the first lens group GR1. Such a variable magnification optical system OS does not serve as a variable magnification optical system extending in a straight line (not a straight type variable magnification optical system), but serves as a bending type variable magnification optical system OS.

Thus, the degree of freedom in disposing the variable magnification optical system OS increases. That is, the variable magnification optical system OS downsized by being bent is arranged at appropriate position in the limited housing of the DSC 29, thus reducing the size of the DSC 29 in the height direction, horizontal direction, and the like. Including the optical prism PR in the first lens group GR1 reduces the size in the depth direction of the DSC 29 provided with the variable magnification optical system OS.

Locating the optical prism PR closer to the image side than the lens element (that is, first lens L1) having the largest negative optical power in the first lens group GR1 (in particular, arranging the first lens L1 and the optical prism PR relatively closely to each other) permits efficiently bending emitted light and also requires an optical prism PR of a relatively small size.

Further, the first lens group GR1 may be immobile in the optical axis direction with respect to the image surface, because such a variable magnification optical system OS does not have the first lens group GR1 projecting to the object side during zooming and thus can serve as a variable magnification optical system OS suitable for a small-size DSC 29.

The zoom ratio (magnification variation ratio) of the variable magnification optical system OS is not limited to any value in particular, but it is preferable that conditional formula (2) below be fulfilled. This conditional formula (2) represents the zoom ratio of the variable magnification optical system OS.

$$2.8 \leq ft/fw \leq 3.1 \qquad \text{Conditional formula (2),}$$

where fw: denotes the focal length (in mm) of the entire variable magnification optical system OS at the wide angle end (W); and ft: denotes the focal length (in mm) of the entire variable magnification optical system OS at the telephoto end (T).

When this conditional formula (2) is fulfilled, the variable magnification optical system OS ensures the zoom ratio (approximately 3×) required for a typical, small-size DSC 29.

Results of the conditional formula (2) are shown below in correspondence with the variable magnification optical systems OS of Examples 1 and 2:

Example 1: 2.850; and
Example 2: 2.850.

An image-taking apparatus is an optical apparatus which optically takes in an image of a subject and then outputs it as an electric signal, and also which forms a main component of a camera used in still image photographing and moving image photographing of a subject. Examples of such cameras include digital still cameras, video cameras, monitoring cameras, in-vehicle cameras, videophone cameras, door phone cameras, and the like.

Examples of such cameras also include cameras incorporated in or externally fitted to personal computers, portable information appliances (compact, portable information terminal, such as mobile computers, cellular phones, personal digital assistants (PDAs)), peripheral devices therefor (such as mouses, scanners, printers, memories, and the like), other digital appliances, and the like.

As these examples show, by the use of an image-taking lens unit, it is possible not only to build a camera but also to load the image-taking lens unit in various devices to provide them with a camera capability. For example, it is possible to realize a digital appliance provided with an image input capability, such as a camera-equipped cellular phone.

The term "digital still camera" in its conventional sense denotes one that exclusively records optical still pictures, but, now that digital still cameras and home-use digital movie cameras that can handle both still and moving pictures at the same time have been proposed, the term has come to be used to denote either type.

Accordingly, in the present specification, the term "digital still camera" denotes any camera that includes as its main component an image-taking lens system for forming an optical image, an image sensor for converting the optical image into an electrical picture signal, and other components, examples of such cameras including digital still cameras, digital movie cameras, and Web cameras (i.e., cameras that are connected, either publicly or privately, to a device connected to a network to permit transmission and reception of images, including both those connected directly to the network and those connected to the network by way of a device, such as a personal computer, having an information processing capability).

The summary of the description above can also be expressed as follows.

The present invention refers to a variable magnification optical system having a plurality of lens groups for imaging light from the object side on the image surface of an image sensor. Such a plurality of lens include at least: in order from the object side to the image side, the first lens group having a negative optical power, the second lens group having a positive optical power, the third lens group having a negative optical power, and the fourth lens group having a positive optical power. Further, this variable magnification optical system moves the second lens group (vibration-proof lens group) in the in-surface direction vertical to the optical axis direction to thereby correct shake resulting from imaging on the image surface.

Such a variable magnification optical system provided with camera-shake correction function generally needs to appropriately set the degree of sensitivity to decentering (ratio of the amount of movement of an image point on the image surface with respect to the amount of movement of the vibration-proof lens group). The degree of sensitivity to decentering may be easily set by providing a long optical path length from the vibration-proof lens group to the image surface.

The variable magnification optical system which permits camera-shake correction function, by moving the second lens group located relatively distant form the image surface, can ensure a longer optical path length than, for example, a variable magnification optical system which performs camera-shake correction by moving the third lens group. Thus, this variable magnification optical system can easily ensure an appropriate degree of sensitivity to decentering and can also prevent harmful effects associated with an excessively large or excessively small degree of sensitivity to decentering.

For example, with a too small degree of sensitivity to decentering, the amount of movement of the vibration-proof lens group needs to be increased, causing a harmful effect that a motor or the like which moves the vibration-proof lens group is upsized. On the other hand, a too large degree of sensitivity to decentering causes a harmful effect that the accuracy of setting the amount of movement of the vibration-proof lens group needs to be increased. These harmful effects lead to problems of upsizing and cost increase of a small-size image-taking apparatus. However, the variable magnification optical system having the second lens group as the vibration-proof lens group can appropriately set the degree of sensitivity to decentering, and thus can avoid these problems.

Due to the movement of the second lens group in the in-surface direction vertical to the optical axis direction, aberration following the movement (decentering aberration) occurs. This decentering aberration is susceptible to the positive optical power of the second lens group. Thus, it is preferable that the variable magnification optical system fulfill conditional formula (1) below. This conditional formula (1) defines balance between suppressing decentering aberration attributable to the second lens group and shortening the full length of the variable magnification optical system.

$$1.7 \leq f2/Y'\text{max} \leq 2.7 \quad \text{Conditional formula (1),}$$

where f2: denotes the focal length of the second lens group; and

Y'max: denotes the maximum image height on the image surface.

For example, if the value of f2/Y'max is smaller than the lower limit of the conditional formula (1) because the focal length of the second lens group is short and the maximum image height is large, the variable magnification optical system achieves satisfactorily higher angle while the positive optical power of the second lens group is relatively strong. Thus, due to the strong positive optical power of the second lens group, the full length of the variable magnification optical system is short. However, due to the excessively large positive optical power, decentering aberration attributable to the second lens group is likely to occur.

On the other hand, for example, if the value of f2/Y'max is larger than the upper limit of the conditional formula (1) because the focal length of the second lens group is long and the maximum image height is small, the variable magnification optical system fails to achieve satisfactorily higher angle but the positive optical power of the second lens group is relatively weak. Thus, due to the weak positive optical power of the second lens group, decentering aberration is less likely to occur. However, due to the excessively small positive optical power, the full length of the variable magnification optical system is long.

Therefore, setting the focal length and maximum image height of the second lens group so that they fall within the range of the conditional formula (1) suppresses decentering aberration attributable to the second lens group and also reduces the full length of the variable magnification optical system.

To suppress the decentering aberration attributable to the second lens group, it is preferable that various aberration in the second lens group be suppressed. Thus, it is preferable that the second lens group include at least: from the object side to the image side, a positive lens element having a surface convex on the object side; a cemented lens element formed by cementing together a positive lens element having a surface convex on the object side and a negative lens element having a surface concave on the image side; and a positive lens element having an aspheric surface or a negative lens element having an aspheric surface.

Such a second lens group converges axial rays by the positive lens element located on the most object side and having a surface convex on the object side and guides it to the cemented lens element. Thus, the axial rays, which enter the cemented lens element, enter this lens element at position relatively close to the optical axis (the height of axial rays (axial height) becomes low). Consequently, under the influence of rays of a low axial height combined with the correcting action of the cemented lens element, spherical aberration is corrected. Moreover, axial rays exiting form the cemented lens element enter the positive lens element or negative lens element having an aspheric surface, thereby suppressing curvature of field. Thus, even when this lens group moves for camera-shake correction, decentering aberration is less likely to occur.

To load a variable magnification optical system in a small-size image-taking apparatus, it is preferable that the variable magnification optical system be formed into such a shape which permits its arrangement in the limited housing of the image-taking apparatus. Thus, it is preferable that the first lens group include an optical axis changing element, because such a variable magnification optical system does not extend in one direction but is formed into a bending shape, which permits its arrangement in the narrow housing.

In the variable magnification optical system, the first lens group is desirably immobile in the optical axis direction with respect to the image surface, because such a variable magnification optical system serves as a variable magnification optical system which does not have the first lens group projecting toward the object side in magnification variation and which is suitable for use in a small-size image-taking apparatus.

Needless to say, an image-taking apparatus provided with a variable magnification optical system as described above is one example of the present invention.

The variable magnification optical system may have a plurality of lens elements for imaging light from the object side on the image surface of an image sensor. In a case where these lens groups are composed of: in order from the object side to the image side, a first lens group having a negative optical power, a second lens group having a positive optical power, a third lens group having a negative optical power, and a fourth lens group having a positive optical power, the second lens group may move in the in-surface direction vertical to the optical axis direction to thereby correct shake resulting from imaging on the image surface.

It is preferable that even a variable magnification optical system having four lens groups as described above fulfill the conditional formula (1).

It is preferable that even a variable magnification optical system composed of four lens groups as described above have a second lens group including at least: from the object side to the image side, a positive lens element having a surface convex on the object side; a cemented lens element formed by cementing together a positive lens element having a surface convex on the object side and a negative lens element having a surface concave on the image side; and a positive lens element having an aspheric surface or a negative lens element having an aspheric surface.

It is preferable that even the variable magnification optical system having four lens groups as described above have an optical axis changing element included in the first lens group thereof, and also that the first lens group be immobile in the optical axis direction with respect to the image surface.

The variable magnification optical system of the invention is provided with, as a vibration-proof lens group, the second lens group located relatively distant from the image surface, and thus can easily and appropriately set the degree of sensitivity to decentering. Thus, this variable magnification optical system can prevent a harmful effect resulting from an excessively large or excessively small degree of sensitivity to decentering.

Moreover, an image-taking apparatus, loaded with this variable magnification optical system, can solve even a problem (upsizing and cost increase of the image-taking apparatus) occurring therein and attributable to the degree of sensitivity to decentering, thus achieving a variable magnification optical system or the like provided with camera-shake correction function suitable for use in a small-size image-taking apparatus.

The immobile property of the first lens group immobile permits achieving a variable magnification optical system suitable for use in a compact image-taking apparatus. In the variable magnification optical system of the invention, the four lens elements (four groups) have a negative, a positive, a negative, and a positive optical powers, thus providing sufficient aberration performance over the magnification variation range closer to the wide angle end.

Even under the presence of the fifth lens group beyond, these lens groups are located closer to the image surface, so that the magnification is close to 1, thus having little influence on the effect of the invention, i.e., "setting the degree of sensitivity to decentering in just proportion". Thus, when the first to fourth groups are defined to have a negative, a positive, a negative, and a positive optical powers, the effect of the invention can be almost achieved.

The detailed embodiments, examples, and the like described above are just provided to clarify the details of the technology of the invention. Thus, the invention should not be limited to the detailed examples and should not be interpreted in a narrow sense. Therefore, various modifications can be made to the invention within the range of the appended claims.

TABLE 1

| | Focal Length Position | | (W)~(M)~(T) | | | |
|---|---|---|---|---|---|---|
| Example 1 | f[mm] | | 5.944~10.046~16.941 | | | |
| | FNo. | | 2.681~3.779~5.100 | | | |
| | 2ω[°] | | 76.844~47.521~28.853 | | | |

| i | ri[mm] | i | di[mm] | i | Ni | νi | Elemnt | |
|---|---|---|---|---|---|---|---|---|
| 1 | ∞ | 1 | 0.700 | 1 | 1.77250 | 49.36 | L1 | GR1 |
| 2 | 5.998 * | 2 | 2.325 | 2 | AIR | AIR | | (−) |
| 3 | ∞ | 3 | 7.160 | 3 | 1.84666 | 23.78 | PR | |
| 4 | ∞ | 4 | 0.100 | 4 | AIR | AIR | | |
| 5 | 187.663 | 5 | 0.600 | 5 | 1.48749 | 70.45 | L2 | |
| 6 | 11.323 | 6 | 1.457 | 6 | 1.80610 | 33.27 | L3 | |
| 7 | 100.449 | 7 | 14.572~8.372~2.082 | 7 | AIR | AIR | | |
| 8 | ∞ | 8 | 0.100 | 8 | AIR | AIR | ST | GR2 |
| 9 | 10.946 | 9 | 1.680 | 9 | 1.67003 | 47.19 | L4 | (+) |
| 10 | −67.617 | 10 | 0.100 | 10 | AIR | AIR | | |
| 11 | 7.828 | 11 | 3.344 | 11 | 1.49700 | 81.61 | L5 | |
| 12 | −28.442 | 12 | 0.786 | 12 | 1.84666 | 23.78 | L6 | |
| 13 | 11.474 | 13 | 1.536 | 13 | AIR | AIR | | |
| 14 | 27.094 * | 14 | 1.200 | 14 | 1.53048 | 55.72 | L7 | |
| 15 | 294.585 * | 15 | 2.685~1.388~4.657 | 15 | AIR | AIR | | |
| 16 | 34.360 | 16 | 0.703 | 16 | 1.88300 | 40.80 | L8 | GR3 |
| 17 | 5.622 | 17 | 1.964 | 17 | 1.71736 | 29.50 | L9 | (−) |
| 18 | 17.636 | 18 | 2.893~10.390~13.411 | 18 | AIR | AIR | | |
| 19 | 48.043 * | 19 | 2.522 | 19 | 1.53048 | 55.72 | L10 | GR4 |
| 20 | −8.704 * | 20 | 1.166 | 20 | AIR | AIR | | (+) |
| 21 | ∞ | 21 | 1.100 | 21 | 1.51680 | 64.20 | LF | |
| 22 | ∞ | | | | | | | |

TABLE 2

Example 1

Aspherical Surface Data
of Surface 2 (i = 2)

| | |
|---|---|
| ε | 1.0000 |
| A10 | −1.68206E−09 |
| A12 | −1.56722E−10 |

Aspherical Surface Data
of Surface 14 (i = 14)

| | |
|---|---|
| ε | 1.0000 |
| A4 | 9.13893E−04 |
| A6 | 3.11590E−05 |
| A8 | 3.61870E−06 |
| A10 | −2.64497E−07 |

Aspherical Surface Data
of Surface 15 (i = 15)

| | |
|---|---|
| ε | 1.0000 |
| A4 | 2.09991E−03 |
| A6 | 4.51156E−05 |
| A8 | 7.89522E−06 |
| A10 | −4.36341E−07 |

Aspherical Surface Data
of Surface 19 (i = 19)

| | |
|---|---|
| ε | 1.0000 |
| A4 | −7.33219E−04 |
| A6 | 2.72532E−05 |

Aspherical Surface Data
of Surface 20 (i = 20)

| | |
|---|---|
| ε | 1.0000 |
| A4 | −9.57789E−05 |
| A6 | 2.61156E−05 |

TABLE 3

| | Focal Length Position | | | (W)~(M)~(T) | | | |
|---|---|---|---|---|---|---|---|
| Example 2 | f[mm] | | | 5.944~10.046~16.941 | | | |
| | FNo. | | | 2.793~3.843~5.100 | | | |
| | 2ω[°] | | | 76.835~47.772~28.867 | | | |

| i | ri[mm] | | i | di[mm] | i | Ni | vi | Elemnt | |
|---|---|---|---|---|---|---|---|---|---|
| 1 | 376.911 | | 1 | 0.700 | 1 | 1.77250 | 49.36 | L1 | GR1 |
| 2 | 5.332 | * | 2 | 2.287 | 2 | AIR | AIR | | (−) |
| 3 | ∞ | | 3 | 6.542 | 3 | 1.84666 | 23.78 | PR | |
| 4 | ∞ | | 4 | 0.100 | 4 | AIR | AIR | | |
| 5 | 21.767 | | 5 | 0.600 | 5 | 1.48749 | 70.45 | L2 | |
| 6 | 12.173 | | 6 | 1.016 | 6 | 1.84666 | 23.78 | L3 | |
| 7 | 30.068 | | 7 | 12.795~6.723~1.000 | 7 | AIR | AIR | | |
| 8 | ∞ | | 8 | 0.100 | 8 | AIR | AIR | ST | GR2 |
| 9 | 9.074 | | 9 | 1.861 | 9 | 1.58144 | 40.89 | L4 | (+) |
| 10 | −35.865 | | 10 | 0.100 | 10 | AIR | AIR | | |
| 11 | 7.153 | | 11 | 3.004 | 11 | 1.49700 | 81.61 | L5 | |
| 12 | −18.373 | | 12 | 0.700 | 12 | 1.84666 | 23.78 | L6 | |
| 13 | 9.611 | | 13 | 1.806 | 13 | AIR | AIR | | |
| 14 | 19.498 | * | 14 | 2.027 | 14 | 1.53048 | 55.72 | L7 | |
| 15 | −107.612 | * | 15 | 1.323~1.807~6.706 | 15 | AIR | AIR | | |
| 16 | −99.708 | | 16 | 1.290 | 16 | 1.88300 | 40.80 | L8 | GR3 |
| 17 | 5.555 | | 17 | 2.423 | 17 | 1.69895 | 30.05 | L9 | (−) |
| 18 | 61.897 | | 18 | 1.616~7.204~8.028 | 18 | AIR | AIR | | |
| 19 | 29.943 | * | 19 | 2.422 | 19 | 1.53048 | 55.72 | L10 | GR4 |
| 20 | −12.994 | * | 20 | 2.656 | 20 | AIR | AIR | | (+) |
| 21 | ∞ | | 21 | 1.100 | 21 | 1.51680 | 64.20 | LF | |
| 22 | ∞ | | | | | | | | |

TABLE 4

Example 2

Aspherical Surface Data
of Surface 2 (i = 2)

| ε | 1.0000 |
|---|---|
| A10 | −7.83481E−08 |
| A12 | 1.59274E−09 |

Aspherical Surface Data
of Surface 14 (i = 14)

| ε | 1.0000 |
|---|---|
| A4 | −7.20084E−04 |
| A6 | 1.75554E−05 |
| A8 | −2.23570E−06 |
| A10 | 1.04389E−07 |

Aspherical Surface Data
of Surface 15 (i = 15)

| ε | 1.0000 |
|---|---|
| A4 | 5.08982E−04 |
| A6 | 2.74951E−05 |
| A8 | −5.03057E−09 |
| A10 | 5.08518E−08 |

Aspherical Surface Data
of Surface 19 (i = 19)

| ε | 1.0000 |
|---|---|
| A4 | −1.74601E−04 |
| A6 | 1.17498E−06 |
| A8 | −4.94404E−08 |

Aspherical Surface Data
of Surface 20 (i = 20)

| ε | 1.0000 |
|---|---|
| A4 | 1.26980E−04 |
| A6 | −5.04572E−06 |

What is claimed is:

1. A variable magnification optical system comprising a plurality of lens groups for imaging light from an object side on an image surface of an image sensor, wherein the plurality of lens groups includes at least: in order from the object side to an image side,
the first lens group having a negative optical power,
the second lens group having a positive optical power,
the third lens group having a negative optical power, and
the fourth lens group having a positive optical power;
wherein, in an in-surface direction vertical to an optical axis direction, the second lens group moves to thereby correct shake resulting from imaging on the image surface,
wherein conditional formula (1) below is fulfilled:

$$1.7 \leq f2/Y'max \leq 2.7 \qquad \text{Conditional formula (1),}$$

where
f2: denotes a focal length of the second lens group; and
Y'max: denotes a maximum image height on the image surface, and
wherein the first lens group is immobile in the optical axis direction with respect to the image surface.

2. The variable magnification optical system according to claim 1,
wherein conditional formula (1)' below is fulfilled:

$$2. \leq f2/Y'max \leq 2.6 \qquad \text{Conditional formula (1)'.}$$

3. The variable magnification optical system according to claim 1,
wherein the second lens group includes at least: from the object side to the image side, a positive lens element having a surface convex on the object side; a cemented lens element formed by cementing together a positive lens element having a surface convex on the object side and a negative lens element having a surface concave on the image side; and a positive lens element having an aspheric surface or a negative lens element having an aspheric surface.

4. The variable magnification optical system according to claim 1, wherein an optical element changing element is included in the first lens group.

5. The variable magnification optical system according to claim 4,
wherein the second lens group includes at least: from the object side to the image side, a positive lens element having a surface convex on the object side; a cemented lens element formed by cementing together a positive lens element having a surface convex on the object side and a negative lens element having a surface concave on the image side; and a positive lens element having an aspheric surface or a negative lens element having an aspheric surface.

6. The variable magnification optical system according to claim 4,
wherein the optical axis changing element is an optical prism, which is located closer to the image side than the lens elements having a maximum negative optical power in the first lens group.

7. The variable magnification optical system according to claim 1,
wherein, in magnification variation from a wide angle end to a telephoto end, the second lens group and the third lens group move with respect to the image surface so that an interval between the first lens group and the second lens group decreases, an interval between the second lens group decreases and the third lens group increases, and an interval between the third lens group and the fourth lens group increases.

8. An image-taking apparatus comprising a plurality of lens groups for imaging light from an object side on an image surface of an image sensor,
wherein the plurality of lens groups includes at least: in order from the object side to an image side,
the first lens group having a negative optical power,
the second lens group having a positive optical power,
the third lens group having a negative optical power, and
the fourth lens group having a positive optical power,
wherein, in an in-surface direction vertical to an optical axis direction, the second lens group moves to thereby correct shake resulting from imaging on the image surface,
wherein conditional formula (1) below is fulfilled:

$$1.7 \leq f2/Y'\text{max} \leq 2.7 \qquad \text{Conditional formula (1),}$$

where
f2: denotes a focal length of the second lens group; and
Y'max: denotes a maximum image height on the image surface, and
wherein the first lens group is immobile in the optical axis direction with respect to the image surface.

9. A variable magnification optical system comprising a plurality of lens groups for imaging light from an object side on an image surface of an image sensor,
wherein the plurality of lens groups includes four lens groups: in order from the object side to an image side,
the first lens group having a negative optical power,
the second lens group having a positive optical power,
the third lens group having a negative optical power, and
the fourth lens group having a positive optical power, and
wherein, in an in-surface direction vertical to an optical axis direction, the second lens group moves to thereby correct shake resulting from imaging on the image surface.

10. The variable magnification optical system according to claim 9,
wherein conditional formula (1) below is fulfilled:

$$1.7 \leq f2/Y'\text{max} \leq 2.7 \qquad \text{Conditional formula (1),}$$

where
f2: denotes a focal length of the second lens group; and
Y'max: denotes a maximum image height on the image surface.

11. The variable magnification optical system according to claim 9,
wherein the second lens group includes at least: from the object side to the image side, a positive lens element having a surface convex on the object side; a cemented lens element formed by cementing together a positive lens element having a surface convex on the object side and a negative lens element having a surface concave on the image side; and a positive lens element having an aspheric surface or a negative lens element having an aspheric surface.

12. The variable magnification optical system according to claim 9,
wherein an optical element changing element is included in the first lens group.

13. The variable magnification optical system according to claim 9,
wherein the first lens group is immobile in the optical axis direction with respect to the image surface.

* * * * *

UNITED STATES PATENT AND TRADEMARK OFFICE
CERTIFICATE OF CORRECTION

PATENT NO. : 7,379,250 B2  
APPLICATION NO. : 11/732401  
DATED : May 27, 2008  
INVENTOR(S) : Yoshihito Souma Page 1 of 1

It is certified that error appears in the above-identified patent and that said Letters Patent is hereby corrected as shown below:

Title Page:  
(30) Foreign Application Priority Data, delete "April 30, 2006" and insert -- April 3, 2006 --.

Column 22:  
line 54, delete "2. ≤f2/Y' max ≤2.6" and insert -- 2 ≤f2/Y' max ≤2.6o --.

Signed and Sealed this

Thirtieth Day of September, 2008

JON W. DUDAS  
*Director of the United States Patent and Trademark Office*